(12) United States Patent
Hikida et al.

(10) Patent No.: US 7,177,779 B2
(45) Date of Patent: Feb. 13, 2007

(54) AZIMUTH MEASURING DEVICE AND AZIMUTH MEASURING METHOD

(75) Inventors: Koichi Hikida, Kanagawa (JP); Masaya Yamashita, Machida (JP)

(73) Assignee: Asahi Kasei EMD Corporation, Tokyo (JP)

( * ) Notice: Subject to any disclaimer, the term of this patent is extended or adjusted under 35 U.S.C. 154(b) by 106 days.

(21) Appl. No.: 10/519,721

(22) PCT Filed: Jun. 30, 2003

(86) PCT No.: PCT/JP03/08293

§ 371 (c)(1),
(2), (4) Date: Dec. 30, 2004

(87) PCT Pub. No.: WO2004/003476

PCT Pub. Date: Jan. 8, 2004

(65) Prior Publication Data

US 2005/0256673 A1     Nov. 17, 2005

(30) Foreign Application Priority Data

Jul. 1, 2002   (JP) .............................. 2002-192546
Feb. 13, 2003  (JP) .............................. 2003-035010

(51) Int. Cl.
*G06F 15/00*   (2006.01)
*G01S 13/08*   (2006.01)

(52) U.S. Cl. ........................................ 702/150; 342/140

(58) Field of Classification Search ................ 702/150; 342/140; 73/178 R
See application file for complete search history.

(56) References Cited

U.S. PATENT DOCUMENTS

| 4,321,678 | A | * | 3/1982 | Krogmann ................... 701/220 |
| 4,497,034 | A | * | 1/1985 | Kuno et al. ................... 702/92 |
| 5,419,631 | A | * | 5/1995 | Slater ......................... 356/508 |
| 5,444,916 | A | * | 8/1995 | Fukushima et al. ........... 33/361 |
| 6,199,020 | B1 | * | 3/2001 | Ando ........................ 702/41 |
| 6,523,271 | B2 | * | 2/2003 | Kato ........................ 33/355 R |
| 2002/0103610 | A1 | * | 8/2002 | Bachmann et al. ........... 702/94 |

FOREIGN PATENT DOCUMENTS

| JP | 62-255815 |   | 11/1987 |
| JP | 08-201059 |   | 8/1996 |
| JP | 10026512  | * | 1/1998 |
| JP | 2000-180170 A |   | 6/2000 |
| JP | 2004-012416 | * | 1/2004 |

* cited by examiner

*Primary Examiner*—John Barlow
*Assistant Examiner*—Cindy D. Khuu
(74) *Attorney, Agent, or Firm*—Finnegan, Henderson, Farabow, Garrett & Dunner, L.L.P.

(57) ABSTRACT

An azimuth measuring device capable of calibrating a magnetic sensor without putting load on a user is provided. When a point having amplified output values Sx, Sy, Sz after a sensitivity correction as x, y, z components is arranged on an xyz coordinate system, an offset information calculation section 8 calculates the center coordinates of such a sphere whose surface is located in the vicinity of each point and calculates an x component of the center coordinates of this sphere as a current offset Cx of an x-axis Hall element HEx, a y component of the center coordinates of this sphere as a current offset Cy of a y-axis Hall element HEy and a z component of the center coordinates of this sphere as a current offset Cz of a z-axis Hall element HEz. It is thereby possible to calibrate the magnetic sensor without putting load on the user.

20 Claims, 12 Drawing Sheets

AZIMUTH MEASURING DEVICE AND AZIMUTH MEASURING METHOD

TECHNICAL FIELD

The present invention relates to an azimuth measuring device and azimuth measuring method, and is preferably applicable to offset corrections of a magnetic sensor in particular.

BACKGROUND ART

An azimuth measuring device which arranges magnetic sensors in two or three directions, measures earth magnetism using the magnetic sensors in the respective directions and measures azimuth is known.

When a magnetized part such as a speaker is placed near the magnetic sensors of such an azimuth measuring device, an offset is produced in the outputs of the magnetic sensors due to a magnetic field leaking from the magnetized part.

In order to prevent errors from occurring in azimuth calculations due to the offset of the magnetic sensors, the above described azimuth measuring device needs to carry out calibration on the azimuth measuring device for the purpose of correcting the offset of the magnetic sensors.

Therefore, a conventional azimuth measuring device carries out calibration on the azimuth measuring device, for example, by rotating the azimuth measuring device around a specific axis at a constant angular velocity.

FIG. 12 illustrates an output waveform of a magnetic sensor when an azimuth measuring device is rotated around the z-axis at a constant angular velocity.

In FIG. 12, when a portable device 301 is rotated around the z-axis at a constant angular velocity $\omega$, an output Srx of an x-axis Hall element HEx mounted on the portable device 301 is given by Formula (1) below:

$$Srx = a_x M_{xy} \cos(\omega t + \theta_0) + X_0 \quad (1)$$

where $a_x$ is sensitivity of the x-axis Hall element Hex and $X_0$ is an offset of the x-axis Hall element HEx.

Furthermore, $$M_{xy} = \sqrt{(M_x^2 + M_y^2)}$$

$$\theta_0 = \tan^{-1}(M_y/M_x)$$

where $M_x$ is an x-direction component of earth magnetism M and $M_y$ is a y-direction component of earth magnetism M.

Therefore, a maximum value $X_{max}$ and minimum value $X_{min}$ of the output Srx of the x-axis Hall element HEx can be expressed by Formulas (2), (3) below:

$$X_{max} = a_x M_{xy} + X_0 \quad (2)$$

$$X_{min} = -a_x M_{xy} + X_0 \quad (3)$$

As a result, from Formulas (2), (3), the offset $X_0$ of the x-axis Hall element HEx can be calculated by Formula (4) below:

$$X_0 = (X_{max} + X_{min})/2 \quad (4)$$

FIG. 13 is a flow chart showing a conventional azimuth measuring method.

In FIG. 13, a calibration start button of the portable device 301 is pressed (step S21).

Then, while keeping the portable device 301 mounted with the x-axis Hall element HEx horizontal, the portable device 301 is slowly rotated 360 degrees at a constant speed (step S22).

After the portable device 301 is rotated 360 degrees, the calibration end button of the portable device 301 is pressed (step S23).

Here, while the portable device 301 is rotated 360 degrees, a maximum value $X_{max}$ and minimum value $X_{min}$ of the output Srx of the x-axis Hall element HEx are searched, a value obtained by adding up these values and then dividing by 2 is assumed to be an offset $X_0$ of the x-axis, and thus it is possible to carry out calibration of the x-axis.

However, according to the conventional azimuth measuring method, it is necessary to rotate the portable device 301 360 degrees or more on a specific plane to search the maximum value $X_{max}$ and minimum value $X_{min}$ of the output Srx of the x-axis Hall element HEx.

As a result, there are problems that when the rotation speed of the portable device 301 does not fall within a certain speed range, the calibration accuracy deteriorates, for example, when the rotation speed of the portable device 301 is too high, the maximum value $X_{max}$ and minimum value $X_{min}$ may be overlooked and when the rotation speed is too low, the amount of data read becomes enormous, causing a memory to overflow.

For this reason, the user is required to repeat trial and error and rotate the portable, device 301 many times until calibration is completed successfully.

Therefore, it is an object of the present invention to provide an azimuth measuring device and azimuth measuring method capable of carrying out calibration on magnetic sensors without putting load on the user.

DISCLOSURE OF THE INVENTION

In order to attain the above-described object, the azimuth measuring device according to item 1 of the present invention comprises earth magnetism detection means with 2 or 3 axes for detecting earth magnetism, output data acquisition means for acquiring 2-axis output data when the orientation of the earth magnetism detection means changes while keeping the detection directions of the two axes on a predetermined plane or 3-axis output data when the orientation of the earth magnetism detection means changes in a three-dimensional space repeatedly a predetermined number of times or more, reference point estimation means for defining a reference point on a two-dimensional coordinate system whose coordinate values correspond to the 2-axis output data or on a three-dimensional coordinate system whose coordinate values correspond to the 3-axis output data and estimating the coordinates of reference point using a statistical technique so that a variation in the distance from the 2-axis or 3-axis output data group acquired by the output data acquisition means to the reference point becomes a minimum, and offset information calculation means for calculating offset information with respect to the output data of the earth magnetism detection means based on the coordinates of reference point.

By so doing, simply changing the orientation of the measuring device on a predetermined plane arbitrarily or three-dimensionally arbitrarily allows offset information of the detection means with respect to each axis output to be calculated.

Here, calculating offset information simply requires the orientation of the measuring device to be changed and the range in which the orientation changes may be limited. For example, when the 2-axis earth magnetism detection means is provided, that range maybe less than 180 degrees or less than 90 degrees or when the 3-axis earth magnetism detection means is provided, that range may be less than $2\pi$ or less than π of solid angle. The position may be changed when the orientation of the measuring device changes.

Thus, the offset can be calibrated without orienting the measuring device to a specified direction or rotating the measuring device at a predetermined speed, reducing the load of offset calibration work on the user.

Furthermore, even if the offset values change drastically due to temperature variation, etc., the user need not repeat offset calibration consciously, and offset calibration is performed automatically while the user is performing normal azimuth measurement, making it possible to reduce load on the user.

Furthermore, the azimuth measuring device according to item 2 of the present invention is the azimuth measuring device according to item 1, wherein the reference point estimation means comprises coefficients and constant term calculation means for calculating coefficients and constant terms of simultaneous linear equations whose unknowns are the coordinates of reference from the 2-axis or 3-axis output data group and simultaneous linear equation analysis means for estimating the coordinates of reference point by calculating solutions to the simultaneous linear equations including the coefficients and constant terms.

This makes it possible to, without increases in the calculation time by increasing the number of acquired output data pieces and using statistical technique, accurately estimate the reference point and increase the offset calibration accuracy.

Furthermore, the azimuth measuring device according to item 3 is the azimuth measuring device according to item 1, wherein the earth magnetism detection means is 3-axis earth magnetism detection means, and when a degree of the variation of the output data group is a predetermined value or below with respect to the output data group of the axis whose degree of variation is a minimum out of the 3-axis output data group, the reference point estimation means defines a reference point on a two-dimensional coordinate system whose coordinate values correspond to the 2-axis output data for the 2-axis output data group which is generated by excluding the output data group of the axis whose degree of variation is a minimum from the 3-axis output data group and estimates the coordinates of reference point from the 2-axis output data group.

In the azimuth measuring device according to the present invention, when 3-axis output data in the case where the orientation of the earth magnetism detection means is changed in the three-dimensional space is acquired repeatedly a predetermined number of times or more by moving or rotating the azimuth measuring device, if the azimuth measuring device is moved or rotated only on the plane perpendicular to any one of the three axes of the earth magnetism detection means (hereinafter referred to as "specific axis" in this paragraph), the output data of the specific axis hardly changes. For this reason, if the coordinates of reference point are estimated from the 3-axis output data group including the output data group of the specific axis, the exact coordinates of reference point may not be obtained. In this case, the exact value can be obtained by rather estimating the coordinates of reference point from the 2-axis output data group except the output data group of the specific axis.

Thus, even when the azimuth measuring device is moved or rotated only on the plane perpendicular to any one of the three axes of the earth magnetism detection means, it is possible to estimate the coordinates of reference point relatively accurately.

The azimuth measuring device according to item 4 of the present invention is the azimuth measuring device according to item 1, wherein the reference point estimation means comprises first difference calculation means for calculating a difference between a maximum value and minimum value of output data in the output data group of each axis from the 2-axis or 3-axis output data group and first difference decision means for deciding whether the difference calculated by the first difference calculation means is equal to or greater than a predetermined value or not, and the reference point estimation means uses the 2-axis or 3-axis output data group for estimating the reference point only when the difference calculated by the first difference calculation means is equal to or greater than a predetermined value.

Thus, when the orientation of the portable device is stationary or changes only a little, it is possible to prevent the coordinates of reference point from being calculated with large errors and improve the accuracy in calculating the coordinates of reference point and keep the accuracy of offset calibration high.

Furthermore, the azimuth measuring device according to item 5 of the present invention is the azimuth measuring device according to item 1, wherein the offset information calculation means comprises variation calculation means for calculating a variation at a predetermined number of the latest reference points calculated by the reference point estimation means, and the offset information calculation means discards the reference point calculated by the reference point estimation means based on the calculation result of the variation calculation means.

Thus, when large errors are included in detected output of earth magnetism due to noise, etc., or especially when the orientation of the 2-axis earth magnetism detection means is deviated from a predetermined plane, it is possible to prevent wrong offset values from being calculated and inappropriate offset correction from being made.

Furthermore, the azimuth measuring device according to item 6 of the present invention is the azimuth measuring device according to item 5, wherein the variation calculation means calculates the difference between the two latest reference points calculated by the reference point estimation means.

Furthermore, the azimuth measuring device according to item 7 of the present invention is the azimuth measuring device according to item 1, further including second variation calculation means for calculating a variation at a predetermined number of the latest reference points calculated by the reference point estimation means and acceptability information creation means for creating acceptability information regarding the acceptability of the offset information based on the calculation result of the second variation calculation means.

According to this structure, the second variation calculation means calculates a variation at a predetermined number of the calculated latest reference points and the acceptability information creation means creates acceptability information based on the calculation result of the variation.

This allows the user to recognize the acceptability of the offset information with reference to the acceptability information.

Furthermore, the azimuth measuring device according to item 8 of the present invention is the azimuth measuring device according to item 7, wherein the acceptability information creation means divides the degree of acceptability of the offset information into a plurality of categories, classifies the offset information into anyone of the categories according to the degree of variation calculated by the second variation calculation means and displays the degree of acceptability corresponding to the category.

According to this structure, the acceptability information creation means classifies the offset information into any one of the categories according to the calculated degree of variation and creates acceptability information indicating the degree of acceptability corresponding to the category.

Thus, it is possible to obtain the degree of acceptability (e.g., degree of acceptability such as excellent, good, fair) corresponding to each category, and thereby further facilitate the recognition of the accept ability of the offset information.

Furthermore, the azimuth measuring device according to item 9 of the present invention is the azimuth measuring device according to item 1, wherein the offset information calculation means comprises distance calculation means for calculating the distance from the output data group to the reference point and distance decision means for deciding whether the distance calculated by the distance calculation means is outside a predetermined range or not, and the offset information calculation means discards the output data group when the distance calculated by the distance calculation means is outside the predetermined range.

According to this structure, the distance calculation means calculates the distance from the output data group to the reference point and the distance decision means decides whether the calculated distance is outside the predetermined range or not. Then, when the calculated distance is outside the predetermined range, the output data is discarded.

Thus, when a static external environment magnetic field exists or when earth magnetism is shielded, it is possible to prevent azimuth from being measured though earth magnetism has not been detected correctly.

Furthermore, the azimuth measuring device according to item 10 of the present invention is the azimuth measuring device according to item 1, further including second distance calculation means for calculating the distance from the output data group to the reference point and reliability information creation means for creating reliability information regarding the reliability of the azimuth measurement result based on the distance calculated by the second distance calculation means.

According to this structure, the second distance calculation means calculates the distance from the output data group to the reference point and the reliability information creation means creates reliability information indicating the degree of reliability according to the calculated distance.

This allows the user to recognize the reliability of the azimuth measurement result with reference to the reliability information.

Furthermore, the azimuth measuring device according to item 11 of the present invention is the azimuth measuring device according to item 10, wherein the reliability information creation means divides the degree of reliability of the azimuth measurement result into a plurality of categories, compares the distance calculated by the second distance calculation means with a plurality of thresholds, classifies the distance into any one of the categories and displays the degree of reliability corresponding to the category.

According to this structure, the reliability information creation means compares the calculated distance with a plurality of thresholds, classifies the distance into any one of the categories and creates reliability information indicating the degree of reliability corresponding to the category.

Thus, it is possible to obtain a degree of reliability corresponding to-each category (e.g., degree of reliability such as excellent, good and fair), which further facilitates the recognition of the reliability of the azimuth measurement result.

Furthermore, the azimuth measuring device according to item 12 of the present invention is the azimuth measuring device according to item 1, wherein the output data acquisition means comprises third difference calculation means for calculating a difference between the output data output from the earth magnetism detection means and a predetermined number of pieces of immediately preceding output data acquired by the output data acquisition means or the output data output immediately before from the earth magnetism detection means and third difference decision means for deciding whether the difference calculated by the third difference calculation means is smaller than a predetermined value or not, and the output data acquisition means does not acquire but discards the output data output from the earth magnetism detection means when the difference calculated by the third difference calculation means is smaller than the predetermined value.

Thus, even if a state in which the orientation of the portable device hardly changes during calibration continues, it is possible to prevent a wrong offset value from being calculated and an inappropriate offset correction from being performed.

On the other hand, in order to attain the above described object, the azimuth measuring method according to item 13 of the present invention comprises a step of changing detection directions of two axes for measurement of earth magnetism while keeping the detection directions of two axes on a predetermined plane or changing the detection directions of three axes in a three-dimensional space, a step of acquiring the 2-axis or 3-axis output data for measurement of earth magnetism when the detection directions change, a step of deciding whether the output data is acquired a predetermined number of times or more or not, a step of defining a reference point on a two-dimensional coordinate system whose coordinate values correspond to the 2-axis output data or on a three-dimensional coordinate system whose coordinate values correspond to the 3-axis output data and estimating the coordinates of reference point using a statistical technique so that a variation in the distance from the output data group consisting of the 2-axis or 3-axis output data acquired the predetermined number of times or more to the reference point becomes a minimum and a step of calculating offset values with respect to the 2-axis or 3-axis output data based on the estimated the coordinates of reference point.

Thus, by only arbitrarily changing the orientation of the portable device on a predetermined plane or arbitrarily changing the orientation of the portable device three-dimensionally, it is possible to calculate an offset value with respect to the measurement result of the earth magnetism and calibrate the offset.

This allows the user to realize offset calibration without the user being aware of the offset calibration, making it possible to reduce load on the user in calibrating the offset.

Furthermore, the azimuth measuring method according to item 14 of the present invention is the azimuth measuring method according to item 13, wherein the step of estimating the coordinates of reference point comprises a step of calculating coefficients and constant terms of simultaneous linear equations whose unknowns are the coordinates of reference point from the 2-axis or 3-axis output data group and a step of calculating solutions to the simultaneous linear equations including the coefficients and constant terms and estimating the coordinates of reference point.

Furthermore, the azimuth measuring method according to item 15 of the present invention is the azimuth measuring method according to item 13, wherein the step of changing the detection direction is intended to change detection directions of three axes in a three-dimensional space and the step of estimating the coordinates of reference point comprises a step of calculating the degree of variation of output data of the output data group of each axis of the 3-axis output data group and obtaining the axis corresponding to the minimum degree of variation and a minimum value of the degree of variation, a step of deciding whether the minimum value of the degree of variation is equal to or lower than a predetermined value or not and a step of defining, when the minimum value of the degree of variation is equal to or lower than the predetermined value, a reference point on a two-dimensional coordinate system whose coordinate values correspond to the 2-axis output data for the 2-axis output data group wherein the output data group of the axis whose degree of variation becomes a minimum is excluded from the 3-axis output data group and estimating the coordinates of reference point from the 2-axis output data group.

Furthermore, the azimuth measuring method according to item 16 of the present invention is the azimuth measuring method according to item 13, wherein the step of estimating the coordinates of reference point comprises a step of calculating the difference between a maximum value and minimum value of output data of the output data group of each axis of the output data group, a step of deciding whether the difference between the maximum value and minimum value is equal to or greater than a predetermined value or not and a step of estimating the coordinates of reference point when the difference between the maximum value and minimum value is equal to or greater than the predetermined value.

Furthermore, the azimuth measuring method according to item 17 of the present invention is the azimuth measuring method according to item 13, wherein the step of calculating offset values with respect to the 2-axis or 3-axis output data comprises a step of calculating a variation at a predetermined number of the latest reference points calculated in the step of estimating the coordinates of reference point and a step of discarding the reference point calculated in the step of estimating the coordinates of reference point based on the calculation result of the variation.

Furthermore, the azimuth measuring method according to item 18 of the present invention is the azimuth measuring method according to item 13, further including a step of calculating a variation at a predetermined number of the estimated latest coordinates of reference points and a step of creating acceptability information regarding the acceptability of the offset values calculated in the step of calculating the offset values based on the calculation result of the variation.

Furthermore, the azimuth measuring method according to item 19 of the present invention is the azimuth measuring method according to item 13, wherein the step of calculating offset values with respect to the 2-axis or 3-axis output data comprises a step of calculating the distance from the output data group to the reference point, a step of deciding whether the distance from the output data group to the reference point is outside a predetermined range or not and a step of discarding the output data group when the distance from the output data group to the reference point is outside the predetermined range.

Furthermore, the azimuth measuring method according to item 20 of the present invention is the azimuth measuring method according to item 13, further including a step of calculating the distance from the output data group to the reference point and a step of creating reliability information regarding the reliability of the azimuth measurement result based on the distance calculation result.

BEST MODE FOR CARRYING OUT THE INVENTION

With reference now to the attached drawings, an azimuth measuring device and azimuth measuring method according to embodiments of the present invention will be explained below.

Figure 1:
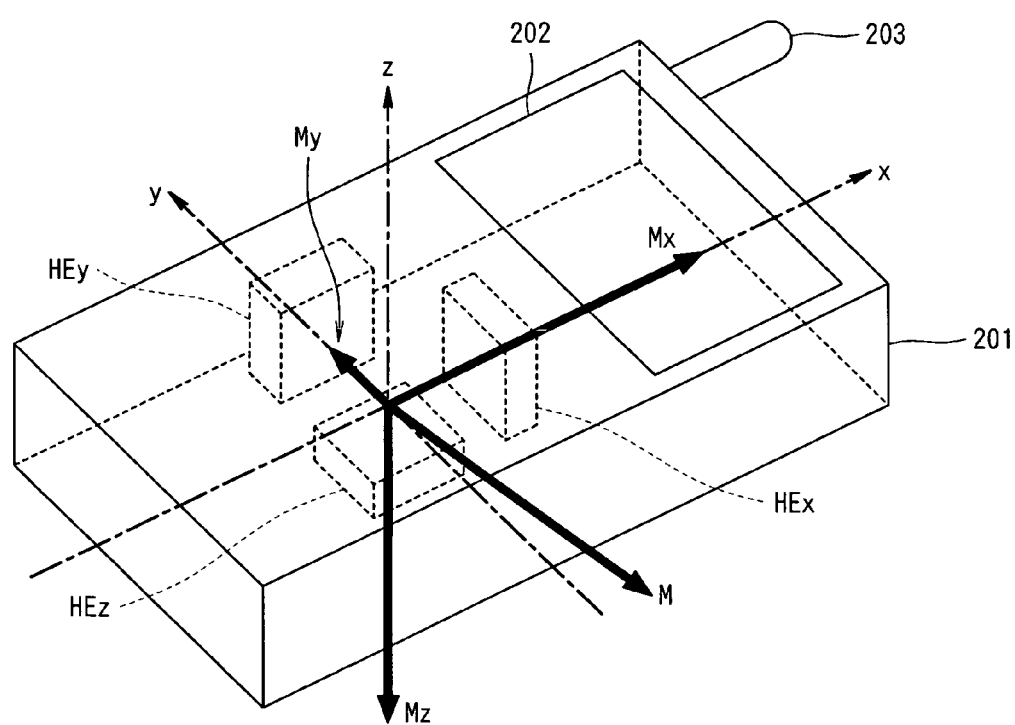
FIG. 1 is a perspective view showing an overall structure of a portable device according to an embodiment of the present invention.

FIG. 1 is a perspective view showing an overall structure of a portable device according to an embodiment of the present invention.

In FIG. 1, a portable device 201 is provided with a display section 202 and an antenna 203 and incorporates an azimuth measuring device which measures earth magnetism on three axes to obtain azimuth.

Here, the azimuth measuring device is provided with an x-axis Hall element HEx which measures an x-direction component Mx of earth magnetism M, a y-axis Hall element HEy which measures a y-direction component My of earth magnetism M and a z-axis Hall element HEz which measures a z-direction component Mz of earth magnetism M, and the x-axis Hall element HEx, y-axis Hall element HEy and z-axis Hall element HEz are arranged in such a way that their respective magnetism sensitive surfaces are perpendicular to the respective axes.

Figure 2:
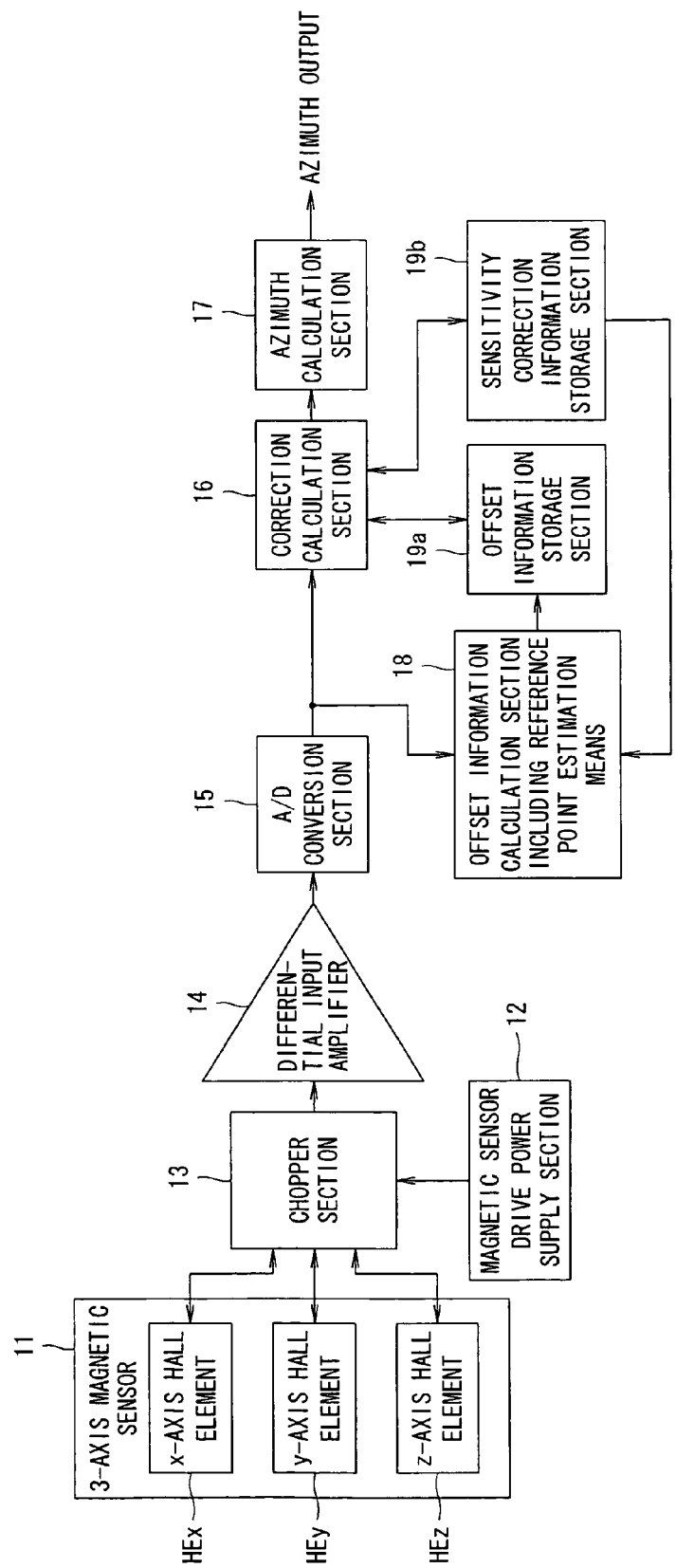
FIG. 2 is a block diagram showing a schematic structure of an azimuth measuring device according to an embodiment of the present invention.

FIG. 2 is a block diagram showing a schematic structure of an azimuth measuring device according to an embodiment of the present invention.

In FIG. 2, the azimuth measuring device is provided with a three-axis magnetic sensor 11, a magnetic sensor drive power supply section 12, a chopper section 13, a differential input amplifier 14, an A/D conversion section 15, a correction calculation section 16, an azimuth calculation section 17, an offset information calculation section 18, an offset information storage section 19a and a sensitivity correction information storage section 19b, and the three-axis magnetic sensor 11 is provided with an x-axis Hall element HEx, a y-axis Hall element HEy and a z-axis Hall element HEz.

The x-axis Hall element HEx, y-axis Hall element HEy and z-axis Hall element HEz are intended to detect earth magnetism and are preferably made of compound semiconductor such as InSb, InAs and GaAs or based on Si monolithic.

The chopper section 13 is intended to switch between terminals for driving the x-axis Hall element HEx, y-axis Hall element HEy and z-axis Hall element HEz, applies a drive voltage output from the magnetic sensor drive power supply section 12 to the x-axis Hall element HEx, y-axis Hall element HEy and z-axis Hall element HEz and outputs the signals output from the x-axis Hall element HEx, y-axis Hall element HEy and z-axis Hall element HEz to the differential input amplifier 14 in a time-sharing manner.

Here, the chopper section 13 can use 90° chopper drive or 360° chopper drive, etc. When driving the x-axis Hall element HEx, y-axis Hall element HEy and z-axis Hall element HEz, the 90° chopper drive can cancel most of the offset terms of the Hall elements themselves included in the outputs of the x-axis Hall element HEx, y-axis Hall element HEy and z-axis Hall element HEz.

The 360° chopper drive can not only cancel the offset terms of the Hall elements themselves included in the outputs of the x-axis Hall element HEx, y-axis Hall element HEy and z-axis Hall element HEz but also easily cancel an electric offset term of the following differential input amplifier 14 itself.

The signals output from the x-axis Hall element HEx, y-axis Hall element HEy and z-axis Hall element HEz are amplified by the differential input amplifier 14, the output value amplified here is converted to a digital signal by the A/D conversion section 15 and then input to the correction calculation section 16.

Here, the amplified output value Srx of the x-axis Hall element HEx can be expressed by Formula (5) below, the amplified output value Sry of the y-axis Hall element HEy can be expressed by Formula (6) below and the amplified output value Srz of the z-axis Hall element HEz can be expressed by Formula (7) below.

$$Srx = ax \cdot Mx + Crx \qquad (5)$$

$$Sry = ay \cdot My + Cry \qquad (6)$$

$$Srz = az \cdot Mz + Crz \qquad (7)$$

where ax is sensitivity of the x-axis Hall element HEx, Crx is an offset of the x-axis Hall element HEx, ay is sensitivity of the y-axis Hall element HEy, Cry is an offset of the y-axis Hall element HEy, az is sensitivity of the z-axis Hall element HEz, Crz is an offset of the z-axis Hall element HEz, Mx is an x-direction component of earth magnetism M, My is a y-direction component of earth magnetism M, and Mz is a z-direction component of earth magnetism M.

The offset information storage section 19a stores the offsets of the x-axis Hall element HEx, y-axis Hall element HEy and z-axis Hall element HEz and the sensitivity correction information storage section 19b stores sensitivity correction information for correcting variations in sensitivity of the x-axis Hall element HEx, y-axis Hall element HEy and z-axis Hall element HEz.

When azimuth measurement is in progress, the correction calculation section 16 corrects the amplified output values Srx, Sry, Srz of the x-axis Hall element HEx, y-axis Hall element HEy and z-axis Hall element HEz using the offset information and sensitivity correction information, picks up only the x, y, z-axis components Mx, My, Mz of earth magnetism M and outputs these components to the azimuth calculation section 17.

The azimuth calculation section 17 calculates azimuth $\theta$ based on the signs of the x, y, z-axis components Mx, My, Mz of earth magnetism M and Formula $\theta = \tan^{-1}(My/Mx)$.

When offset calibration is in progress, the amplified output values Srx, Sry, Srz of the x-axis Hall element HEx, y-axis Hall element HEy and z-axis Hall element HEz are output to the offset information calculation section 18.

When the orientation of the portable device 201 is arbitrarily changing in a three-dimensional space, the offset information calculation section 18 acquires the amplified output values Srx, Sry, Srz of the x-axis Hall element HEx, y-axis Hall element HEy and z-axis Hall element HEz a predetermined number of times or more and corrects sensitivity based on the sensitivity correction information stored in the sensitivity correction information storage section 19b.

Here, the amplified output value Sx of the x-axis Hall element HEx, amplified output value Sy of the y-axis Hall element HEy and amplified output value Sz of the z-axis Hall element HEz after the sensitivity correction can be expressed by Formulas (8), (9) and (10) below:

$$Sx = a0/ax \cdot Srx = a0 \cdot Mx + Cx \qquad (8)$$

$$Sy = a0/ay \cdot Sry = a0 \cdot My + Cy \qquad (9)$$

$$Sz = a0/az \cdot Srz = a0 \cdot Mz + Cz \qquad (10)$$

where a0/ax is a sensitivity correction coefficient of the x-axis Hall element HEx, a0/ay is a sensitivity correction coefficient of the y-axis Hall element HEy, a0/az is a sensitivity correction coefficient of the z-axis Hall element HEz and a0 is sensitivity after the sensitivity corrections of the x-axis Hall element HEx, y-axis Hall element HEy and z-axis Hall element HEz.

Furthermore, Cx is an offset after the sensitivity correction of the x-axis Hall element HEx, Cy is an offset after the sensitivity correction of the y-axis Hall element HEy and Cz is an offset after the sensitivity correction of the z-axis Hall element HEz, and $$Cx = a0/ax \cdot Crx$$

$$Cy = a0/ay \cdot Cry$$

$$Cz = a0/az \cdot Crz$$

When the amplified output values Sx, Sy, Sz are arranged on an xyz coordinate system as the x, y, z components respectively, the offset information calculation section 18 estimates the coordinates of a reference point whose distances from the respective points become as equal as possible.

The offset information storage section 19a stores the x component of the coordinates of this reference point as a current offset Cx of the x-axis Hall element HEx, the y component of the coordinates of this reference point as a current offset Cy of the y-axis Hall element HEy and the z component of the coordinates of this reference point as a current offset Cz of the z-axis Hall element HEz.

Since sensitivity of the x-axis Hall element HEx, y-axis Hall element HEy and z-axis Hall element HEz hardly changes when the portable device 201 is in use, the sensitivity correction information on the x-axis Hall element HEx, y-axis Hall element HEy and z-axis Hall element HEz may be stored only once when the portable device 201 is manufactured.

Figure 3:
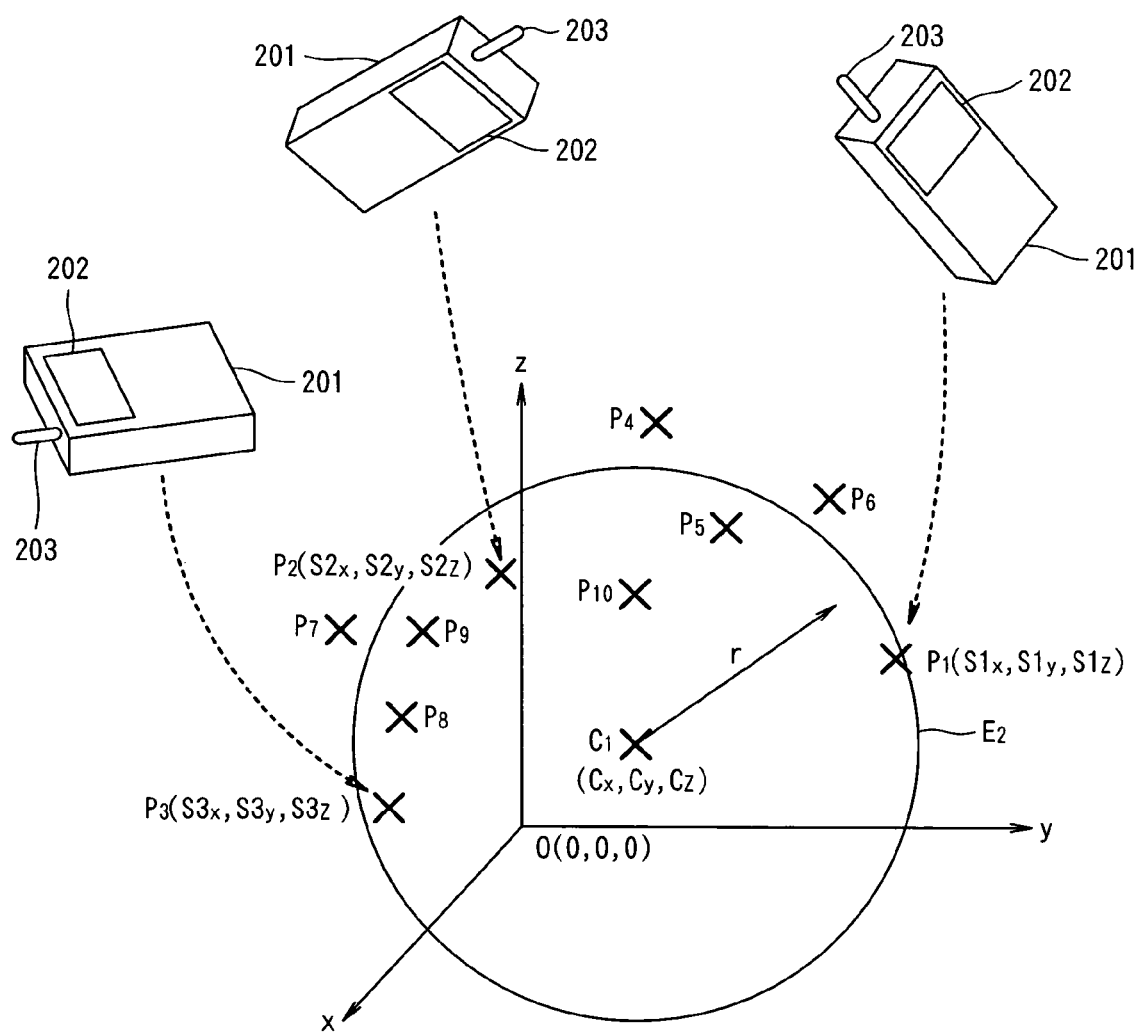
FIG. 3 illustrates a concept of an azimuth measuring method according to an embodiment of the present invention.

FIG. 3 illustrates the concept of the azimuth measuring method according to an embodiment of the present invention.

In FIG. 3, the orientation of the portable device 201 is changed arbitrarily in a three-dimensional space and the amplified output value Sx of the x-axis Hall element HEx, amplified output value Sy of the y-axis Hall element HEy and the amplified output value Sz of the z-axis Hall element HEz are acquired repeatedly in the meantime. Then, as shown in FIG. 3, in the xyz space in which Sx, Sy, Sz correspond to the x, y, z-axis direction components, the repeatedly acquired Sx, Sy, Sz data are arranged as $P_1(S1x, S1y, S1z)$, $P_2(S2x, S2y, S2z)$, $P_3(S3x, S3y, S3z)$, ....

Here, when Formulas (8), (9), (10) are modified as follows:

$$\frac{S_x - C_x}{a_0} = M_x \tag{11}$$

$$\frac{S_y - C_y}{a_0} = M_y \tag{12}$$

$$\frac{S_z - C_z}{a_0} = M_z \tag{13}$$

On the other hand, the relationship between Mx, My, Mz and earth magnetism M is:

$$M = \sqrt{M_x^2 + M_y^2 + M_z^2} \tag{14}$$

and earth magnetism M can be considered constant unless the location of the portable device 201 is changed drastically.

Thus, if $$r = a_0 \sqrt{M_x^2 + M_y^2 + M_z^2} \tag{15}$$

is assumed, the following formula holds:

$$(S_x - C_x)^2 + (S_y - C_y)^2 + (S_z - C_z)^2 = r^2 \tag{16}$$

That is, in the xyz space, $P_1(S1x, S1y, S1z)$, $P_2(S2x, S2y, S2z)$, $P_3(S3x, S3y, S3z)$, ... are all located at a constant distance r from a reference point C1 whose x, y, z-axis coordinate values consist of offsets Cx, Cy, Cz of the HEx, HEy, HEz.

Therefore, by estimating the reference point C1 from $P_1(S1x, S1y, S1z)$, $P_2(S2x, S2y, S2z)$, $P_3(S3x, S3y, S3z)$, ..., it is possible to obtain the offsets Cx, Cy, Cz of the HEx, HEy, HEz from the x, y, z-axis coordinate values of C1.

There are various types of calculation methods to estimate C1 and C1 can be estimated by acquiring data at least four times. However, since the Sx, Sy, Sz data actually acquired are measured data of extremely feeble earth magnetism on the order of 0.01 mT and overlap with considerable noise, and therefore it is preferable to calculate C1 with the number of data pieces to be acquired set to 5 or 10 or more if possible using a statistical technique. Therefore, it is possible to estimate C1 accurately using the calculation method which will be described later using a statistical technique with an increase in the calculation time suppressed.

In the xyz space whose x, y, z-axis direction components consist of Sx, Sy, Sz respectively, the distance di from the Sx, Sy, Sz data $P_1(S1x, S1y, S1z)$ which has been acquired at the ith time to C1 is as follows:

$$d_i = \sqrt{(Si_x - C_x)^2 + (Si_y - C_y)^2 + (Si_z - C_z)^2} \tag{17}$$

By comparing Formula (17) with Formula (16) above, if the acquired Sx, Sy, Sz data don't overlap with noise and C1 has been estimated ideally, di must be equal to r. However, both are not always equal, and therefore the difference between the square of di and the square of r is defined as a C1 estimation error $\epsilon_i$ at $P_i(Six, Siy, Siz)$ as shown in the following formula:

$$\epsilon_i = d_i^2 - r^2 \tag{18}$$
$$= (Si_x - C_x)^2 + (Si_y - C_y)^2 + (Si_z - C_z)^2 - r^2$$

Further, the square sum total of $\epsilon_i$ is defined as S expressed by the following formula.

$$S = \Sigma \epsilon_i^2 \tag{19}$$
$$= \Sigma \{(Si_x - C_x)^2 + (Si_y - C_y)^2 + (Si_z - C_z)^2 - r^2\}^2$$

Obtaining such Cx, Cy, Cz that minimize this square sum total S is appropriate as the estimation method.

When S becomes a minimum, the derivatives of S with respect to Cx, Cy, Cz and r are all considered to be 0. The respective derivatives become as follows:

$$\frac{\partial S}{\partial C_x} = -4\Sigma \{(Si_x - C_x)^2 + (Si_y - C_y)^2 + (Si_z - C_z)^2 - r^2\}(Si_x - C_x) \tag{20}$$

$$\frac{\partial S}{\partial C_y} = -4\Sigma \{(Si_x - C_x)^2 + (Si_y - C_y)^2 + (Si_z - C_z)^2 - r^2\}(Si_y - C_y) \tag{21}$$

$$\frac{\partial S}{\partial C_z} = -4\Sigma \{(Si_x - C_x)^2 + (Si_y - C_y)^2 + (Si_z - C_z)^2 - r^2\}(Si_z - C_z) \tag{22}$$

$$\frac{\partial S}{\partial r} = -4\Sigma \{(Si_x - C_x)^2 + (Si_y - C_y)^2 + (Si_z - C_z)^2 - r^2\} \tag{23}$$

When all these derivatives become 0, the following formulas are obtained.

$$\Sigma\{(Si_x - C_x)^2 + (Si_y - C_y)^2 + (Si_z - C_z)^2 - r^2\}(Si_x - C_x) = 0 \tag{24}$$

$$\Sigma\{(Si_x - C_x)^2 + (Si_y - C_y)^2 + (Si_z - C_z)^2 - r^2\}(Si_y - C_y) = 0 \tag{25}$$

$$\Sigma\{(Si_x - C_x)^2 + (Si_y - C_y)^2 + (Si_z - C_z)^2 - r^2\}(Si_z - C_z) = 0 \tag{26}$$

$$\Sigma\{(Si_x - C_x)^2 + (Si_y - C_y)^2 + (Si_z - C_z)^2\} - Nr^2 = 0 \tag{27}$$

where N: number of data pieces acquired.

When Formula (27) above is solved with respect to $r^2$, the formula becomes as follows:

$$r^2 = \frac{1}{N}\Sigma\{(Si_x - C_x)^2 + (Si_y - C_y)^2 + (Si_z - C_z)^2\} \quad (28)$$

The following formulas are obtained by substituting Formula (28) into Formulas (24), (25) and (26) and rearranging them:

$$C_x\Sigma Si_x(Si_x - \overline{S_x}) + C_y\Sigma Si_y(Si_x - \overline{S_x}) + C_z\Sigma Si_z(Si_x - \overline{S_x}) = \quad (29)$$
$$\frac{1}{2}\Sigma(Si_x^2 + Si_y^2 + Si_z^2)(Si_x - \overline{S_x})$$

$$C_x\Sigma Si_x(Si_y - \overline{S_y}) + C_y\Sigma Si_y(Si_y - \overline{S_y}) + C_z\Sigma Si_z(Si_y - \overline{S_y}) = \quad (30)$$
$$\frac{1}{2}\Sigma(Si_x^2 + Si_y^2 + Si_z^2)(Si_y - \overline{S_y})$$

$$C_x\Sigma Si_x(Si_z - \overline{S_z}) + C_y\Sigma Si_y(Si_z - \overline{S_z}) + C_z\Sigma Si_z(Si_z - \overline{S_z}) = \quad (31)$$
$$\frac{1}{2}\Sigma(Si_x^2 + Si_y^2 + Si_z^2)(Si_z - \overline{S_z})$$

where $$\overline{S_x} = \frac{1}{N}Si_x \quad (32)$$

$$\overline{S_y} = \frac{1}{N}Si_y \quad (33)$$

$$\overline{S_z} = \frac{1}{N}Si_z \quad (34)$$

Formulas (29), (30) and (31) are expressed in matrix forms as follows:

$$\begin{bmatrix} \Sigma Si_x(Si_x - \overline{S_x}) & \Sigma Si_y(Si_x - \overline{S_x}) & \Sigma Si_z(Si_x - \overline{S_x}) \\ \Sigma Si_x(Si_y - \overline{S_y}) & \Sigma Si_y(Si_y - \overline{S_y}) & \Sigma Si_z(Si_y - \overline{S_y}) \\ \Sigma Si_x(Si_z - \overline{S_z}) & \Sigma Si_y(Si_z - \overline{S_z}) & \Sigma Si_z(Si_z - \overline{S_z}) \end{bmatrix}\begin{bmatrix} C_x \\ C_y \\ C_z \end{bmatrix} = \frac{1}{2}\begin{bmatrix} \Sigma(Si_x^2 + Si_y^2 + Si_z^2)(Si_x - \overline{S_x}) \\ \Sigma(Si_x^2 + Si_y^2 + Si_z^2)(Si_y - \overline{S_y}) \\ \Sigma(Si_x^2 + Si_y^2 + Si_z^2)(Si_z - \overline{S_z}) \end{bmatrix} \quad (35)$$

Formula (35) above are simultaneous linear equations with respect to Cx, Cy, Cz and the solutions can be calculated using well known solutions to simultaneous linear equations such as LU decomposition. Therefore, it is possible to calculate Cx, Cy, Cz when S becomes a minimum while suppressing an increase in the calculation time.

The following equations are also derived from Formula (35) above, and therefore a formula which is convenient for calculation of the solution can be selected.

$$\begin{bmatrix} \Sigma Si_x(Si_x - \overline{S_x}) & \Sigma Si_y(Si_x - \overline{S_x}) & \Sigma Si_z(Si_x - \overline{S_x}) \\ \Sigma Si_y(Si_x - \overline{S_x}) & \Sigma Si_y(Si_y - \overline{S_y}) & \Sigma Si_z(Si_y - \overline{S_y}) \\ \Sigma Si_z(Si_x - \overline{S_x}) & \Sigma Si_z(Si_y - \overline{S_y}) & \Sigma Si_z(Si_z - \overline{S_z}) \end{bmatrix}\begin{bmatrix} C_x \\ C_y \\ C_z \end{bmatrix} = \frac{1}{2}\begin{bmatrix} \Sigma(Si_x^2 + Si_y^2 + Si_z^2)(Si_x - \overline{S_x}) \\ \Sigma(Si_x^2 + Si_y^2 + Si_z^2)(Si_y - \overline{S_y}) \\ \Sigma(Si_x^2 + Si_y^2 + Si_z^2)(Si_z - \overline{S_z}) \end{bmatrix} \quad (36)$$

$$\begin{bmatrix} \Sigma Si_x^2 - N\overline{S_x}^2 & \Sigma Si_x Si_y - N\overline{S_x S_y} & \Sigma Si_x Si_z - N\overline{S_x S_z} \\ \Sigma Si_x Si_y - N\overline{S_x S_y} & \Sigma Si_y^2 - N\overline{S_y}^2 & \Sigma Si_y Si_z - N\overline{S_y S_z} \\ \Sigma Si_x Si_z - N\overline{S_x S_z} & \Sigma Si_y Si_z - N\overline{S_y S_z} & \Sigma Si_z^2 - N\overline{S_z}^2 \end{bmatrix}\begin{bmatrix} C_x \\ C_y \\ C_z \end{bmatrix} = \frac{1}{2}\begin{bmatrix} \Sigma(Si_x^2 + Si_y^2 + Si_z^2)(Si_x - \overline{S_x}) \\ \Sigma(Si_x^2 + Si_y^2 + Si_z^2)(Si_y - \overline{S_y}) \\ \Sigma(Si_x^2 + Si_y^2 + Si_z^2)(Si_y - \overline{S_z}) \end{bmatrix} \quad (37)$$

Furthermore, if the number of data pieces acquired is increased and an estimation calculation of the reference point C1 is performed using the above described calculation method, the Sx, Sy, Sz data $P_1$(S1x, S1y, S1z), $P_2$(S2x, S2y, S2z), $P_3$(S3x, S3y, S3z), . . . repeatedly acquired in FIG. 3 need not always be distributed in all directions when viewed from C1 and may also be limited to within a range of, for example, about $2\pi$ to $\pi$ in terms of a solid angle. That is, the directions toward $P_1$(S1x, S1y, S1z), $P_2$(S2x, S2y, S2z), $P_3$(S3x, S3y, S3z), . . . viewed from C1 correspond to the orientations of the portable device 201 when the respective pieces of data are acquired, and therefore it is not necessary to orient the portable device 201 in all directions uniformly when an offset value is calibrated, and the orientations of the portable device 201 may be limited to within a range of, for example, about $2\pi$ to $\pi$ in terms of a solid angle.

Figure 4:
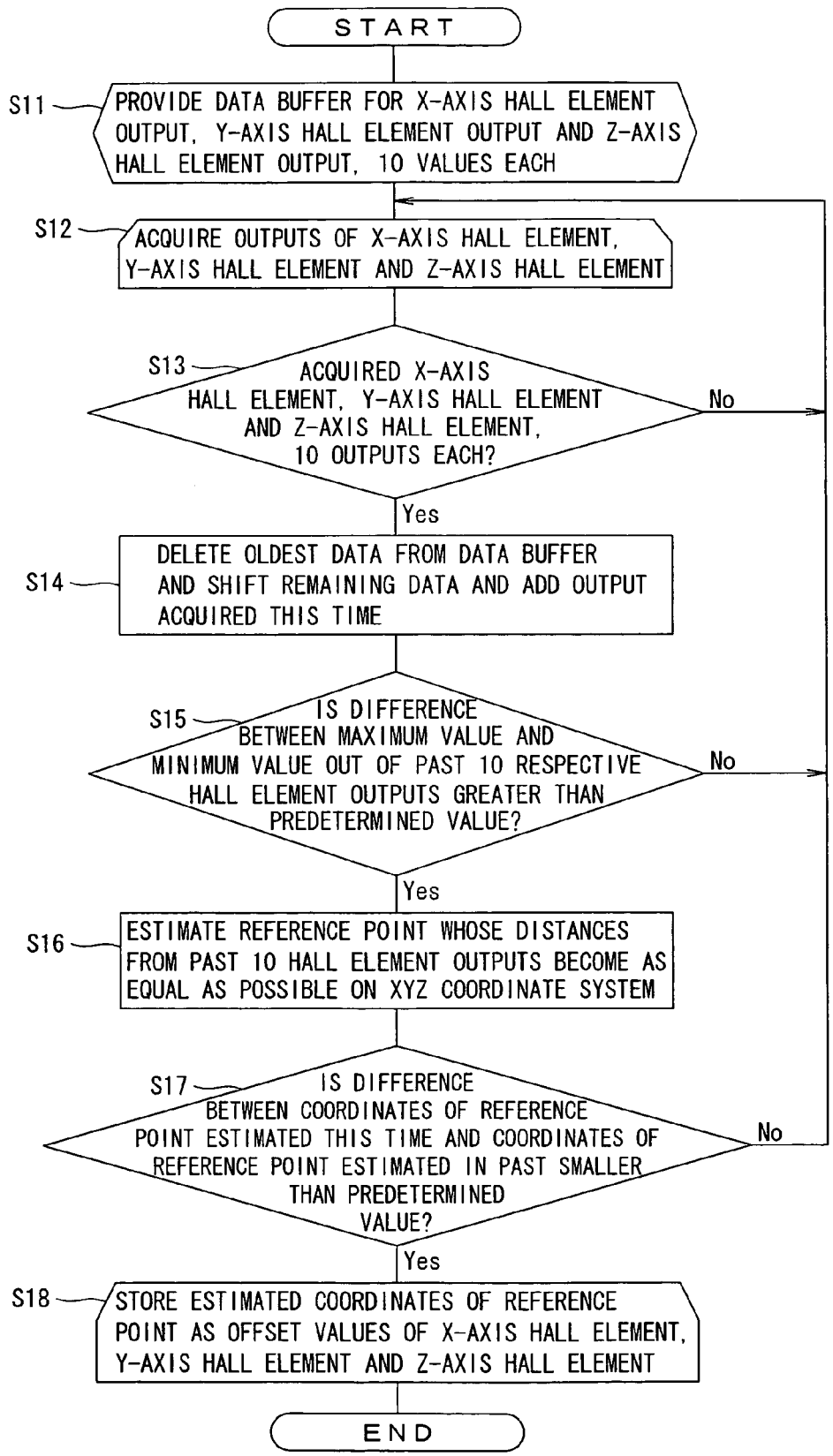
FIG. 4 is a flow chart showing an azimuth measuring method according to an embodiment of the present invention.

FIG. 4 is a flow chart showing an azimuth measuring method according to an embodiment of the present invention.

In FIG. 4, the offset information calculation section 18 provides a data buffer for storing the amplified output value Srx of the x-axis Hall element HEx, amplified output value Sry of the y-axis Hall element HEy and amplified output value Srz of the z-axis Hall element HEz, 10 values each (step S11).

Then, the offset information calculation section 18 acquires the amplified output values Srx, Sry, Srz of the x-axis Hall element HEx, y-axis Hall element HEy and z-axis Hall element HEz, 10 values each (step S12, S13), multiplies the amplified output values Srx, Sry, Srz of the x-axis Hall element HEx, y-axis Hall element HEy and z-axis Hall element HEz by sensitivity correction coefficients respectively based on the sensitivity correction information stored in the sensitivity correction information storage section 19b to obtain amplified output values Sx, Sy, Sz after sensitivity corrections of the x-axis Hall element HEx, y-axis Hall element HEy and z-axis Hall element HEz.

After acquiring the amplified output values Sx, Sy, Sz after sensitivity corrections of the x-axis Hall element HEx, y-axis Hall element HEy and z-axis Hall element HEz, 10 values each, the offset information calculation section 18 deletes the oldest data from the data buffer, shifts the remaining data and adds the amplified output values Sx, Sy, Sz acquired this time (step S14).

Then, the offset information calculation section 18 decides whether the difference between a maximum value and minimum value of the respective past 10 amplified output values Sx, Sy, Sz after sensitivity corrections of the x-axis Hall element HEx, y-axis Hall element HEy and z-axis Hall element HEz is greater than a predetermined value, for example, about ⅓ of a0M or not (step S15).

When the difference between a maximum value and minimum value obtained in step S15 is equal to or smaller than the predetermined value, the offset information calculation section 18 discards the amplified output values Sx, Sy, Sz acquired this time, goes back to step S12 and newly acquires amplified output values Srx, Sry, Srz of the x-axis Hall element HEx, y-axis Hall element HEy and z-axis Hall element HEz.

On the other hand, when the difference between a maximum value and minimum value obtained in step S15 is greater than the predetermined value, the offset information calculation section 18 estimates the coordinates (Cx, Cy, Cz) of such a reference point C1 whose distances from points $P_1$(S1x, S1y, S1z), $P_2$(S2x, S2y, S2z), $P_3$ (S3x, S3y, S3z), . . . in which the 10 amplified output values Sx, Sy, Sz correspond to xyz components respectively become as equal as possible (step S16).

Next, the offset information calculation section 18 decides whether the difference between the coordinates (Cx, Cy, Cz) of the reference point C1 estimated this time and the coordinates (Cx, Cy, Cz) of the reference point C1 estimated last time is smaller than a predetermined value, for example, about a0M or not (step S17), discards the coordinates (Cx, Cy, Cz) of the reference point C1 estimated this time if it is equal to or greater than the predetermined value, goes back to step S12 and newly acquires amplified output values Srx, Sry, Srz of the x-axis Hall element HEx, y-axis Hall element HEy and z-axis Hall element HEz.

On the other hand, when the difference between the coordinates (Cx, Cy, Cz) of the reference point C1 estimated this time and the coordinates (Cx, Cy, Cz) of the reference point C1 estimated last time is smaller than the predetermined value, the offset information calculation section 18 causes the offset information storage section 19a to store the x, y, z components of the coordinates (Cx, Cy, Cz) of the reference point C1 estimated this time as the offset Cx of the x-axis Hall element HEx, offset Cy of the y-axis Hall element HEy and offset Cz of the z-axis Hall element HEz (step S18).

The above described embodiment assumes that the azimuth measuring device is incorporated in the portable device, but it is also possible to accommodate the azimuth measuring device in a case which can be inserted into or detached from a portable device such as a PDA (Personal Digital Assistant) or notebook personal computer and use this azimuth measuring device mounted in the portable device.

For example, it is possible to provide the azimuth measuring device, its data processing IC and interface IC, etc., in a PCMCIA card inserted in a PC card slot provided as standard for a notebook personal computer and incorporate the above-described calibration function as a driver.

The PC card slot has a standard for mechanical and electrical characteristics but has no magnetic characteristic such as leakage flux density inside the slot, and therefore the azimuth measuring device provided inside a general-purpose PCMCIA card cannot predict leakage flux density generated in the notebook personal computer beforehand.

Here, by incorporating the calibration function of the azimuth measuring device in the PCMCIA card, it is possible to accurately correct an offset of the azimuth measuring device even when the leakage magnetic field of the PC card slot varies from one portable device to another and freely mount and use the azimuth measuring device without being limited to a specific portable device.

In the PCMCIA card, it is also possible to mount a tilt sensor, signal processing IC of a GPS (Global Positioning System) and antenna together with the azimuth measuring device and the card format is not limited to the PCMCIA card and may also be made adaptable to a CF card slot.

Furthermore, the above described embodiment has described the case where Hall elements are used as magnetic sensors as an example, but the magnetic sensors are not limited to Hall elements and flux gate sensors, etc., may also be used.

In the above described embodiment, the offset information calculation section 18 is constructed so as to estimate the coordinates of a reference point in such a way that when amplified output values Sx, Sy, Sz are arranged on an xyz coordinate system as points representing x, y, z components respectively, distances of the reference point from the respective points become as equal as possible, but the present invention is not limited to this and the offset information calculation section 18 may also be adapted so as to estimate the coordinates of a reference point in such a way that in the case where the rates of variation of the amplified output values Sx, Sy, Sz are all equal to or greater than a predetermined value, for example, about ⅓ of a0M, the amplified output values Sx, Sy, Sz are arranged on an xyz coordinate system as points representing x, y, z components, the distances of the reference point from the respective points become as equal as possible, and when one of the amplified output values Sx, Sy, Sz has a minimum rate of variation and when the rate of variation of that amplified output value is equal to or smaller than a predetermined value, the offset information calculation section 18 may also be adapted so as to estimate the coordinates of a reference point in such a way that when the amplified output values of other than that having the minimum rate of variation out of the amplified output values Sx, Sy, Sz are arranged on an xy coordinate system as points representing x, y components respectively, the distances from the respective points become as equal as possible.

As a specific method of calculating the rates of variations of amplified output value Sx, Sy, Sz, a calculation of standard deviation, calculation of a difference between a maximum value and minimum value, etc., may be used.

Thus, even when the azimuth measuring device is moved or rotated only on a plane perpendicular to any one of three axes of the three-axis magnetic sensor 11, it is possible to estimate the coordinates of a reference point relatively accurately.

Furthermore, the above described embodiment is constructed in such a way that it is decided in steps S7, S17 whether a difference between the coordinates (Cx, Cy, Cz) of the reference point C1 estimated this time and the coordinates (Cx, Cy, Cz) of the reference point C1 estimated last time is smaller than a predetermined value or not, but the present invention is not limited to this and the present invention may also be adapted so as to compare the coordinates (Cx, Cy, Cz) of the reference point C1 estimated this time with the coordinates (Cx, Cy, Cz) of a plurality of reference points C1 estimated last time and before last time. More specifically, variations of a predetermined number of reference points C1 estimated latest (including reference point C1 estimated this time) are calculated and the calculated degrees of variations are decided. There may be various methods for calculating variations such as calculating a difference between a maximum value and minimum value of those reference points C1, calculating a standard deviation of those reference points C1, calculating an average of reference points C1 estimated until last time and calculating a difference between the reference points C1 estimated this time and the average, etc. Thus, using a plurality of past estimated values for the coordinates of a reference point C1 can further improve the accuracy.

Furthermore, the above described embodiment has not particularly referred to displaying the acceptability of offset information, but the present invention is not limited to this and may also be adapted so as to display the accept ability of offset information on the display section 202. More specifically, the degree of acceptability of offset information is classified into a plurality of categories such as excellent, good and fair. Then, focused on a predetermined number of reference points C1 estimated latest (including reference point C1 estimated this time), variations of those reference points C1 are calculated, the reference point C1 estimated this time is classified into any one of categories according to the calculated degree of variations, acceptability information indicating the acceptability corresponding to the category is created and the degree of acceptability of the offset information is displayed on the display section 202 based on the acceptability information created.

Here, the aforementioned method can be used to use a plurality of past estimated values of the coordinates of reference points C1.

This allows the user to recognize the acceptability of offset information with reference to the degree of acceptability displayed.

Furthermore, in the above described embodiment, it is possible to calculate the distances from Sx, Sy, Sz data $P_1(S1x, S1y, S1z)$, $P_2(S2x, S2y, S2z)$, $P_3(S3x, S3y, S3z)$, . . . repeatedly acquired in FIG. 3 to the estimated reference point C1, decide whether the calculated distance is outside a predetermined range, for example, smaller than ½ of a0M or greater than 1.5 times a0M or not, and discard the output data if the calculated distance is outside the predetermined range. The distance can also be calculated from Formula (28) above using the following formula:

$$r = \sqrt{\frac{1}{N}\Sigma\{(Si_x - C_x)^2 + (Si_y - C_y)^2 + (Si_z - C_z)^2\}} \quad (38)$$

Thus, when a static external environment magnetic field exists or earth magnetism is shielded, it is possible to prevent azimuth from being measured despite the fact that earth magnetism has not been detected correctly.

Furthermore, the above described embodiment can also be adapted so as to display reliability of the azimuth measurement result on the display section 202. More specifically, the reliability of the azimuth measurement result is divided into a plurality of categories such as excellent, good and fair. Then, the distances from points $P_1$ (S1x, S1y, S1z), $P_2$(S2x, S2y, S2z), $P_3$(S3x, S3y, S3z), . . . to the coordinates (Cx, Cy, Cz) of the reference point C1 are calculated, the calculated distances are compared with a plurality of thresholds, classified into any one of categories, reliability information showing the degree of reliability corresponding to the category is created and the degree of reliability of the azimuth measurement result is displayed on the display section 202 based on the reliability information created.

This allows the user to recognize the reliability of the azimuth measurement result with reference to the degree of reliability displayed.

Figure 5:
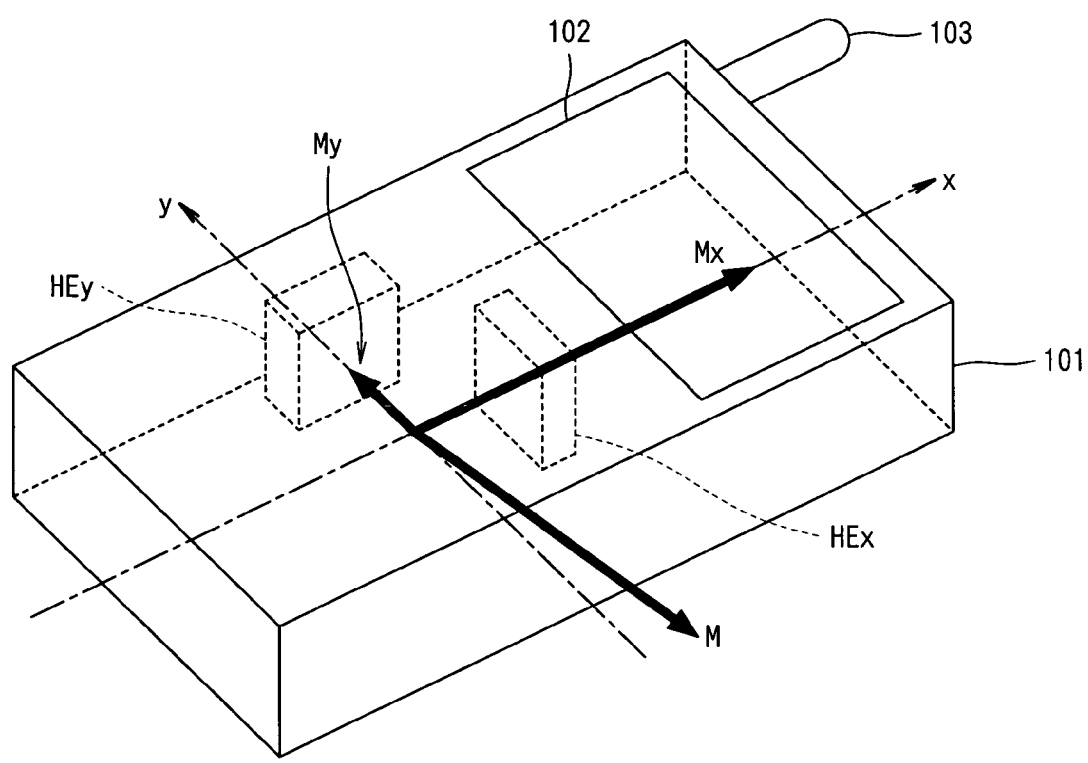
FIG. 5 is a perspective view showing an overall structure of a portable device according to an embodiment with two axes.

The above described embodiment has described the case of the azimuth measuring device having 3-axis earth magnetism detection means, but the present invention is not limited to this and the present invention is also applicable to an azimuth measuring device having 2-axis earth magnetism detection means as shown in FIG. 5.

Figure 6:
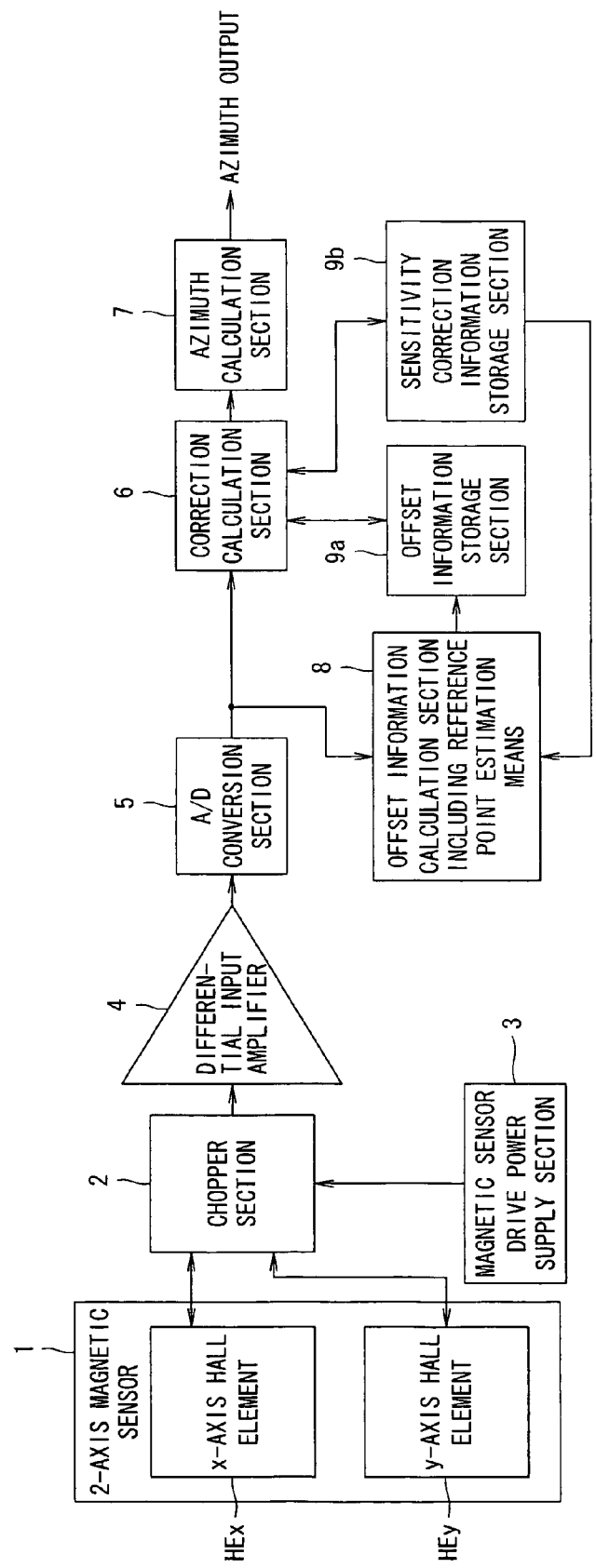
FIG. 6 is a block diagram showing an overall structure of an azimuth measuring device according to an embodiment with two axes.
Figure 7:
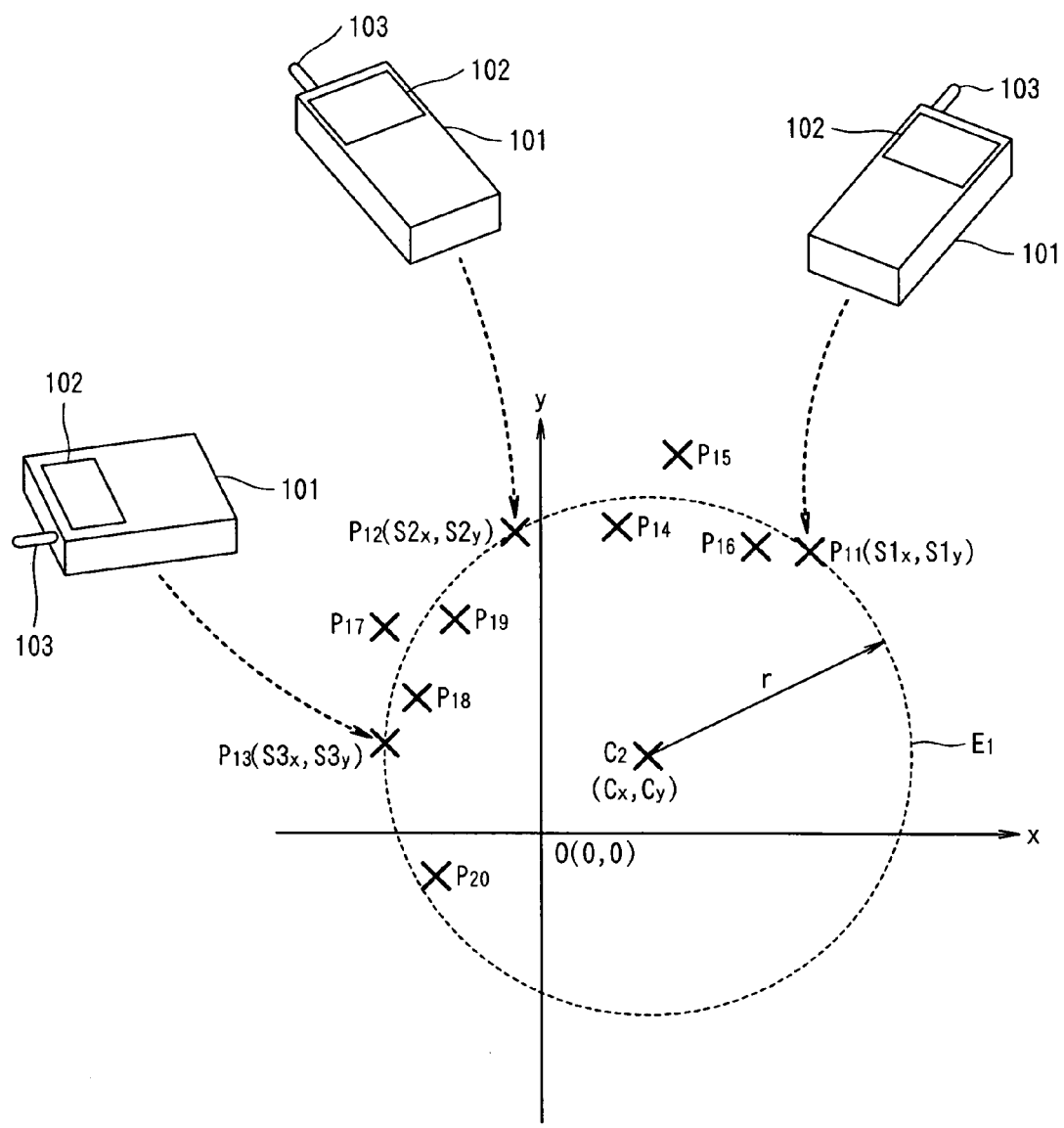
FIG. 7 illustrates a concept of an azimuth measuring method according to an embodiment with two axes.
Figure 8:
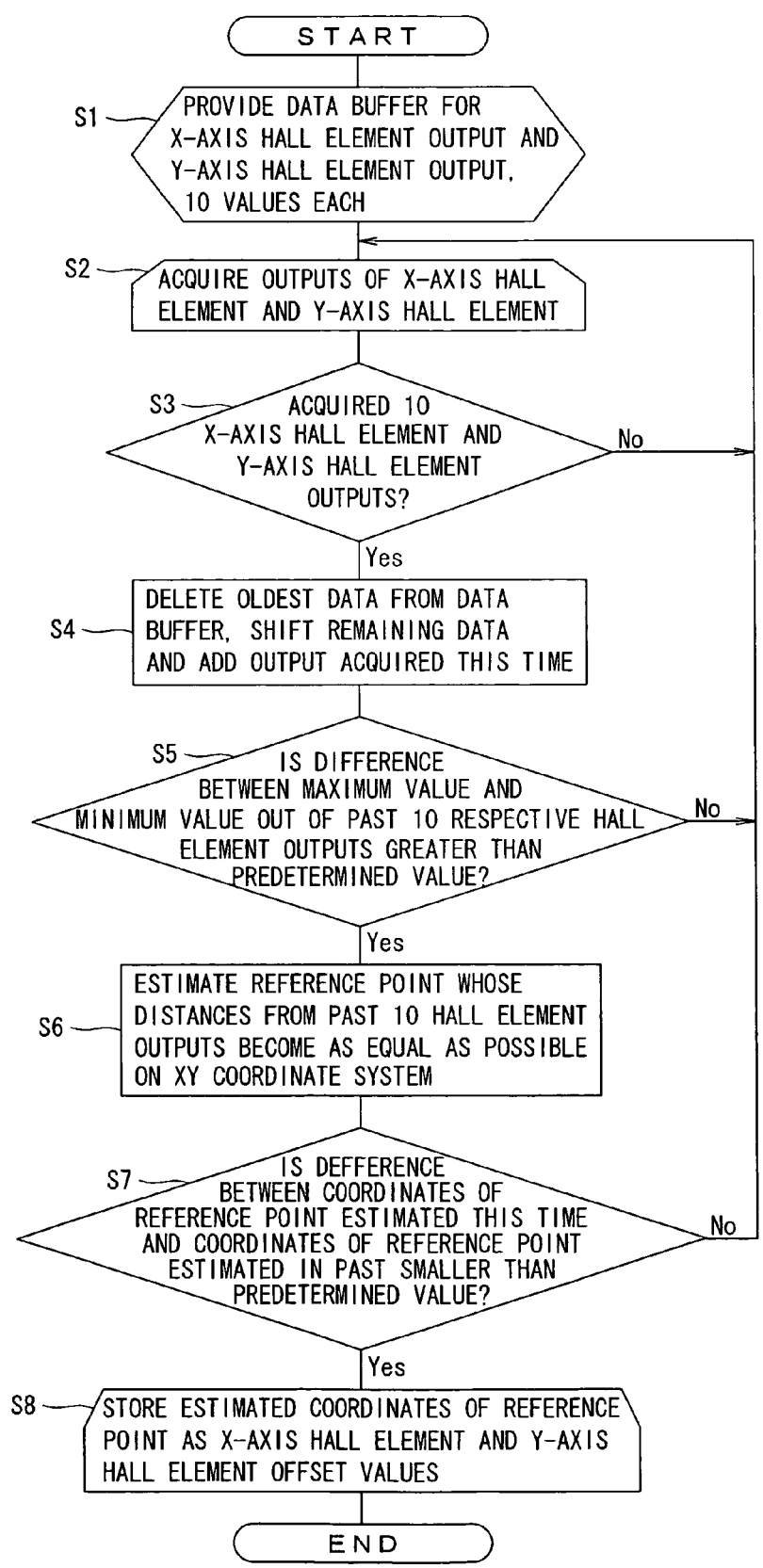
FIG. 8 is a flow chart showing an azimuth measuring method according to an embodiment with two axes.

In this case, a block diagram showing a schematic structure of the azimuth measuring device, a figure illustrating the concept of the azimuth measuring method and a flow chart of offset calibration are as shown in FIGS. 6 to 8.

Furthermore, in the case of the azimuth measuring device having 3-axis earth magnetism detection means, the orientation of the portable device 201 is arbitrarily changed in a three-dimensional space and the amplified output value Sx of the x-axis Hall element HEx, amplified output value Sy of the y-axis Hall element HEy and amplified output value Sz of the z-axis Hall-element HEz are acquired repeatedly in the meantime, but in the case of the azimuth measuring device having 2-axis earth magnetism detection means, the orientation of the portable device 101 is changed while keeping the earth magnetism detection directions of two axes on a predetermined plane and the amplified output value Sx of the x-axis Hall element HEx and amplified output value Sy of the y-axis Hall element HEy are acquired repeatedly in the meantime. By replacing Formulas (14) to (37) above by Formulas (39) to (58) shown below, the present invention can be applied likewise.

$$\sqrt{M_x^2 + M_y^2} = const \quad (39)$$

$$r = a_0\sqrt{M_x^2 + M_y^2} \quad (40)$$

$$(S_x - C_x)^2 + (S_y - C_y)^2 = r^2 \quad (41)$$

$$d_i = \sqrt{(Si_x - C_x)^2 + (Si_y - C_y)^2} \quad (42)$$

$$\varepsilon_i = d_i^2 - r^2 \quad (43)$$
$$= (Si_x - C_x)^2 + (Si_y - C_y)^2 - r^2$$

$$S = \Sigma\varepsilon_i^2 \quad (44)$$
$$= \Sigma\{(Si_x - C_x)^2 + (Si_y - C_y)^2 - r^2\}^2$$

$$\frac{\partial S}{\partial C_x} = -4\Sigma\{(Si_x - C_x)^2 + (Si_y - C_y)^2 - r^2\}(Si_x - C_x) \quad (45)$$

$$\frac{\partial S}{\partial C_y} = -4\Sigma\{(Si_x - C_x)^2 + (Si_y - C_y)^2 - r^2\}(Si_y - C_y) \quad (46)$$

$$\frac{\partial S}{\partial r} = -4\Sigma\{(Si_x - C_x)^2 + (Si_y - C_y)^2 - r^2\} \quad (47)$$

$$\Sigma\{(Si_x - C_x)^2 + (Si_y - C_y)^2 - r^2\}(Si_x - C_x) = 0 \quad (48)$$

$$\Sigma\{(Si_x - C_x)^2 + (Si_y - C_y)^2 - r^2\}(Si_y - C_y) = 0 \quad (49)$$

$$\Sigma\{(Si_x - C_x)^2 + (Si_y - C_y)^2\} - Nr^2 = 0 \quad (50)$$

$$r^2 = \frac{1}{N}\Sigma\{(Si_x - C_x)^2 + (Si_y - C_y)^2\} \quad (51)$$

$$C_x\Sigma Si_x(Si_x - \overline{S_x}) + C_y\Sigma Si_y(Si_x - \overline{S_x}) = \frac{1}{2}\Sigma(Si_x^2 + Si_y^2)(Si_x - \overline{S_x}) \quad (52)$$

-continued $$C_x \Sigma Si_x(Si_y - \overline{S_y}) + C_y \Sigma Si_y(Si_y - \overline{S_y}) \quad (53)$$
$$= \frac{1}{2} \Sigma (Si_x^2 + Si_y^2)(Si_y - \overline{S_y})$$

$$\overline{S_x} = \frac{1}{N} \Sigma Si_x \quad (54)$$

$$\overline{S_y} = \frac{1}{N} \Sigma Si_y \quad (55)$$

$$\begin{bmatrix} \Sigma Si_x(Si_x - \overline{S_x}) \Sigma Si_y(Si_x - \overline{S_x}) \\ \Sigma Si_x(Si_y - \overline{S_y}) \Sigma Si_y(Si_y - \overline{S_y}) \end{bmatrix} \begin{bmatrix} C_x \\ C_y \end{bmatrix} \quad (56)$$
$$= \frac{1}{2} \begin{bmatrix} \Sigma(Si_x^2 + Si_y^2)(Si_x - \overline{S_x}) \\ \Sigma(Si_x^2 + Si_y^2)(Si_y - \overline{S_y}) \end{bmatrix}$$

$$\begin{bmatrix} \Sigma Si_x(Si_x - \overline{S_x}) \Sigma Si_y(Si_x - \overline{S_x}) \\ \Sigma Si_y(Si_y - \overline{S_x}) \Sigma Si_y(Si_y - \overline{S_y}) \end{bmatrix} \begin{bmatrix} C_x \\ C_y \end{bmatrix} \quad (57)$$
$$= \frac{1}{2} \begin{bmatrix} \Sigma(Si_x^2 + Si_y^2)(Si_x - \overline{S_x}) \\ \Sigma(Si_x^2 + Si_y^2)(Si_y - \overline{S_y}) \end{bmatrix}$$

$$\begin{bmatrix} \Sigma Si_x^2 - N\overline{S_x}^2 \Sigma Si_xSi_y - N\overline{S_xS_y} \\ \Sigma Si_xSi_y - N\overline{S_xS_y} \Sigma Si_y^2 - N\overline{S_y}^2 \end{bmatrix} \begin{bmatrix} C_x \\ C_y \end{bmatrix} \quad (58)$$
$$= \frac{1}{2} \begin{bmatrix} \Sigma(Si_x^2 + Si_y^2)(Si_x - \overline{S_x}) \\ \Sigma(Si_x^2 + Si_y^2)(Si_y - \overline{S_y}) \end{bmatrix}$$

Furthermore, when a reference point C2 is estimated by solving the simultaneous linear equations shown in Formulas (56), (57) or (58), increasing the number of data pieces acquired eliminates the necessity for uniformly orienting the portable device 101 which calibrates offset values in all directions and the orientation of the portable device 101 may be limited within a range of about 180° to 90°. By replacing Formula (38) by Formula (59) below, the present invention can be applied likewise.

$$r = \sqrt{\frac{1}{N} \Sigma \{(Si_x - C_x)^2 + (Si_y - C_y)^2\}} \quad (59)$$

In acquiring the Sx, Sy, Sz data, the above described embodiment repeats data acquisition unconditionally until the number of data pieces acquired reaches a predetermined value. However, it is also possible to calculate a difference between the Sx, Sy, Sz data acquired immediately before every time the Sx, Sy, Sz data is acquired and discard the acquired Sx, Sy, Sz data when the difference is smaller than the predetermined value.

Thus, even when a state in which the orientation of the portable device hardly changes during calibration continues, it is possible to prevent wrong offset values from being calculated causing inappropriate offset corrections to be carried out.

Figure 9:
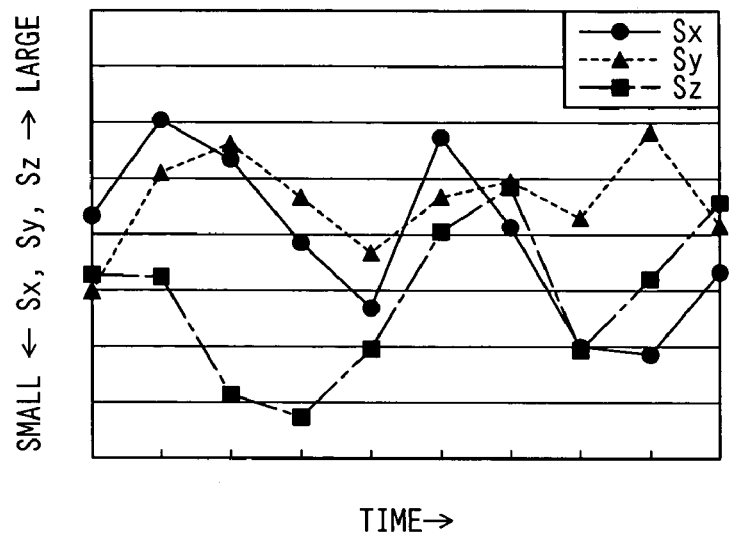
FIG. 9 is a graph showing a variation on the time axis of Sx, Sy, Sz data acquired when the orientation of the portable device changes appropriately.
Figure 10:
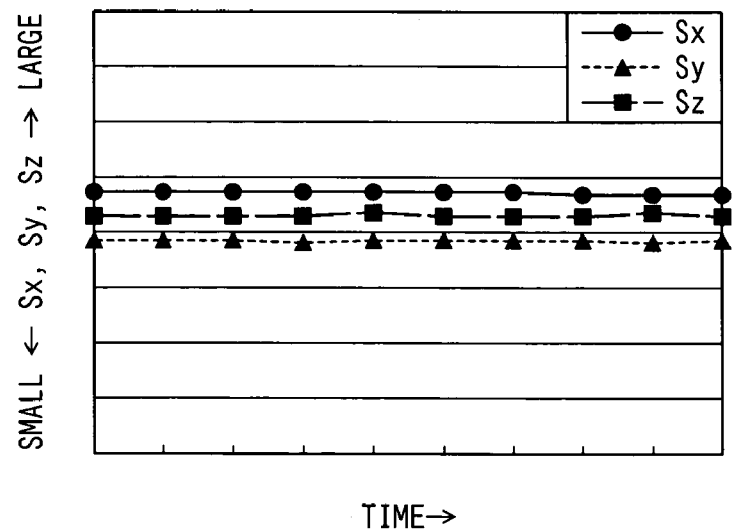
FIG. 10 is a graph showing a variation on the time axis of Sx, Sy, Sz data acquired when the orientation of the portable device hardly changes.

FIG. 9 shows an example of the Sx, Sy, Sz data acquired when the orientation of the portable device is changing appropriately and all data is changing with time. On the other hand, FIG. 10 shows an example of the Sx, Sy, Sz data acquired when the orientation of the portable device hardly changes and all data remains substantially constant.

In the case of the Sx, Sy, Sz data shown in FIG. 10, the difference between the maximum value and minimum value of the Sx, Sy, Sz data is decided to be equal to or below a predetermined value in step S15 in the offset calibration flow chart shown in FIG. 4, and therefore the process does not move to the step of estimating a reference point.

Figure 11:
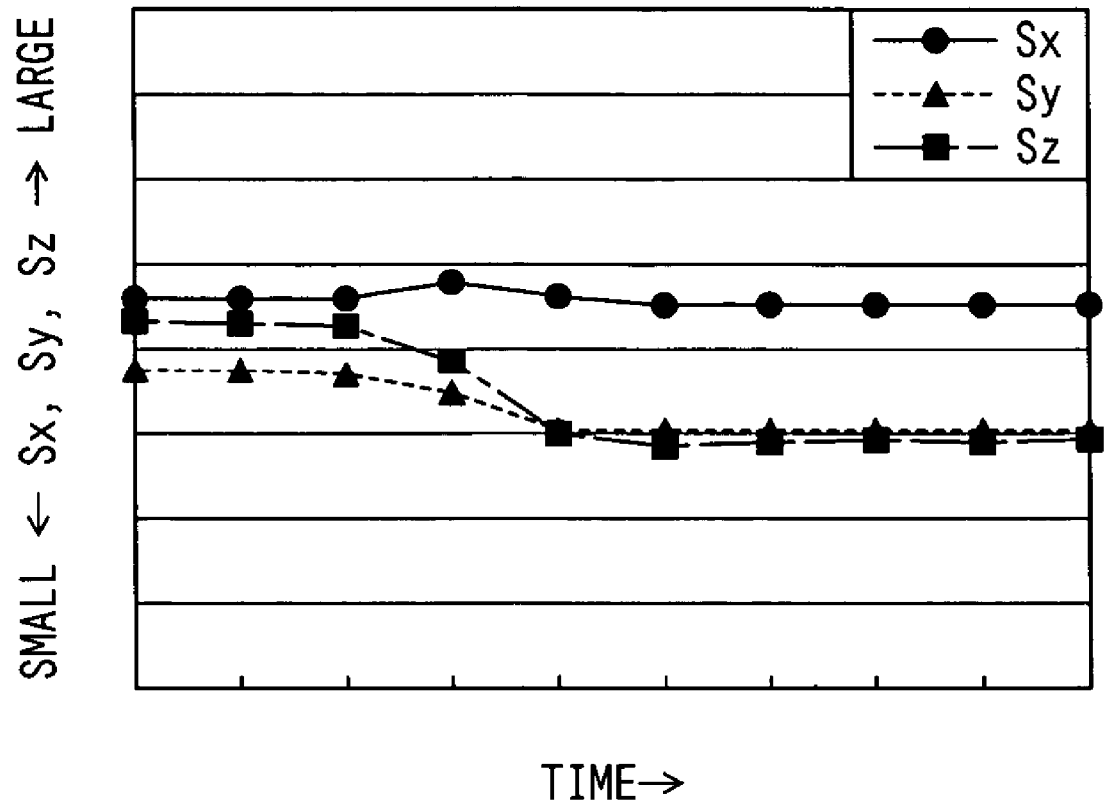
FIG. 11 is a graph showing a variation on the time axis of Sx, Sy, Sz data when the orientation of the portable device changes only for a short time when the Sx, Sy, Sz data is being acquired.
Figure 12:
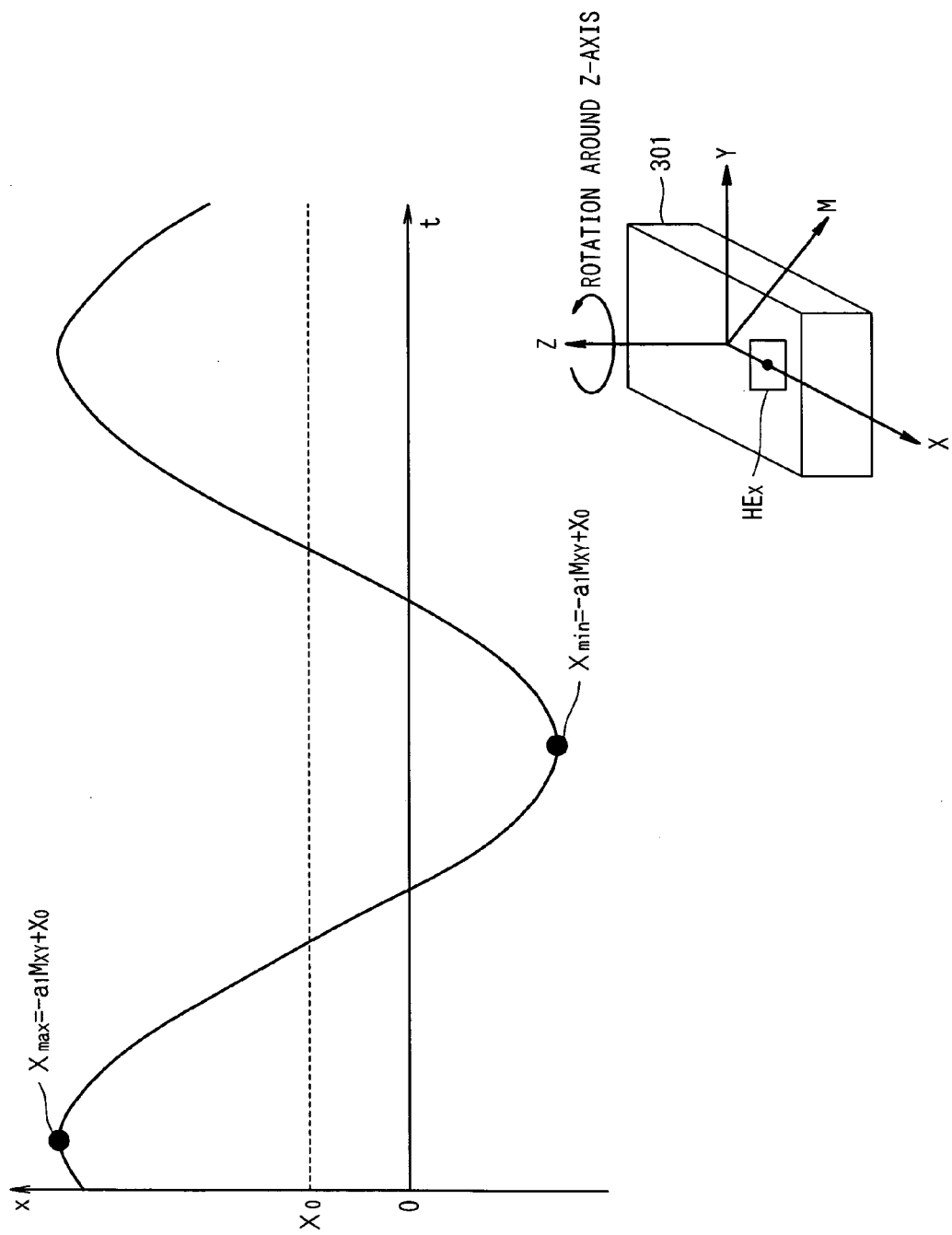
FIG. 12 illustrates an output waveform of a magnetic sensor when an azimuth measuring device is rotated around the z-axis at a constant angular velocity.
Figure 13:
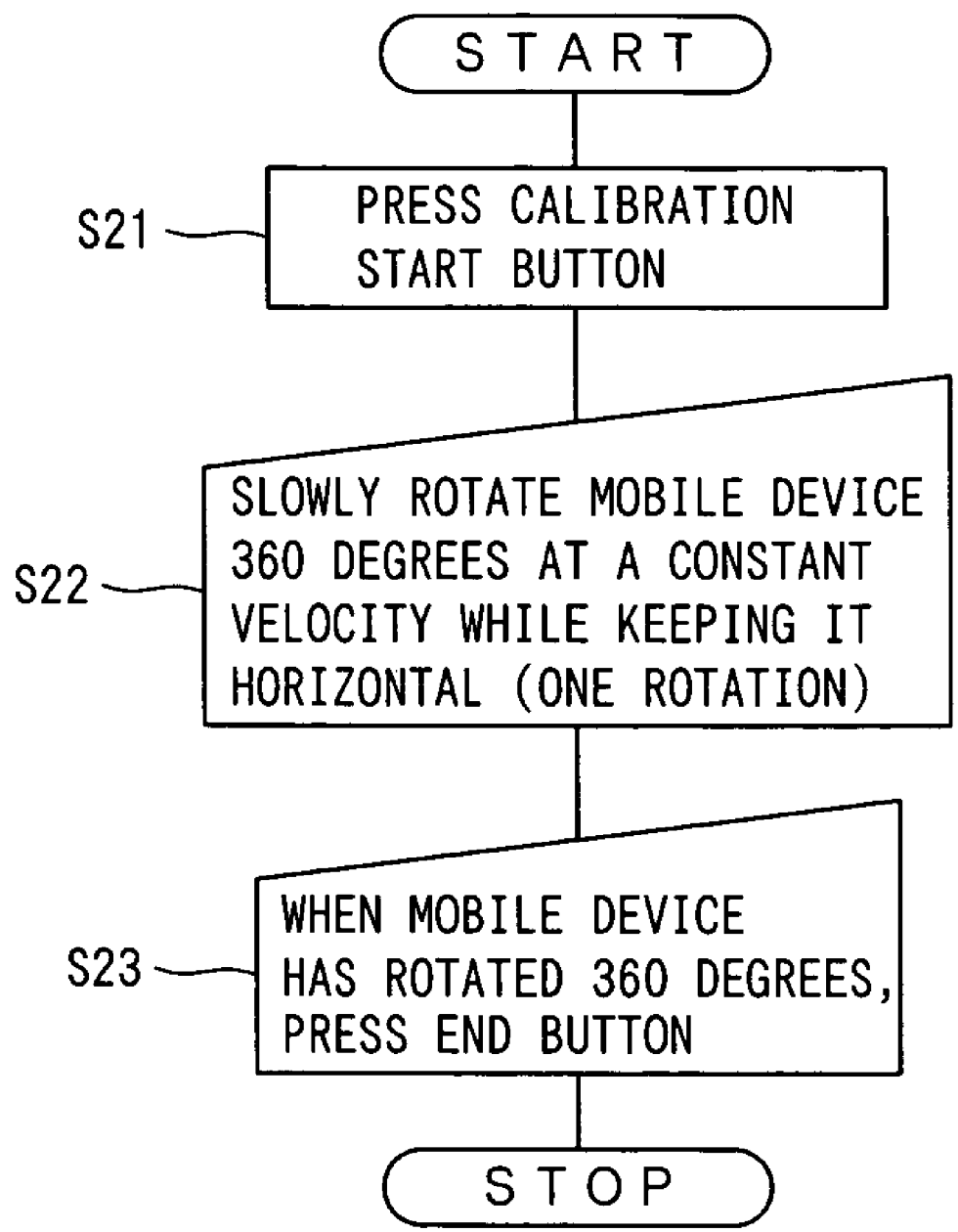
FIG. 13 is a flow chart showing an azimuth measuring method of a conventional azimuth measuring device.

However, when the orientation of the portable device changes only for a short time while the Sx, Sy, Sz data is being acquired, the Sx, Sy, Sz data becomes as shown in FIG. 11 and parts whose values change appear. In this case, in step S15, the difference between the maximum value and minimum value of the Sx, Sy, Sz data may be decided to be greater than a predetermined value and the process may move to the step of estimating a reference point. This causes a considerably large error to occur in estimating the reference point with the result that wrong offset values are calculated.

Therefore, by calculating difference from the Sx, Sy, Sz data acquired immediately before every time the Sx, Sy, Sz data is acquired and discarding the Sx, Sy, Sz data when the difference is smaller than a predetermined value, it is possible to prevent reference points from being estimated with inappropriate Sx, Sy, Sz data because the acquired Sx, Sy, Sz data is discarded as long as the orientation of the portable device hardly changes.

There may be various specific methods of calculating differences of Sx, Sy, Sz data and deciding whether or not to discard the data, for example, calculating a difference for each piece of the Sx, Sy, Sz data and discarding the Sx, Sy, Sz data if all the differences do not exceed a predetermined value or calculating the sum of squares of respective differences of the Sx, Sy, Sz data and discarding the Sx, Sy, Sz data when the result does not exceed the predetermined value.

INDUSTRIAL APPLICABILITY

As described above, according to the azimuth measuring device according to items 1 to 12 or the azimuth measuring method according to items 13 to 20, it is possible to calculate offset information with respect to the output of each axis of the earth magnetism detection means by only arbitrarily changing the orientation of the portable device, simplify the offset calibration work and reduce load on the user when carrying out offset calibration.

The invention claimed is:
1. An azimuth measuring device comprising:
earth magnetism detection means with 2 or 3 axes for detecting earth magnetism;
output data acquisition means for acquiring 2-axis output data when the orientation of said earth magnetism detection means changes while keeping the detection directions of said two axes on a predetermined plane or 3-axis output data when the orientation of said earth magnetism detection means changes in a three-dimensional space repeatedly a predetermined number of times or more;
reference point estimation means for defining a reference point on a two-dimensional coordinate system whose coordinate values correspond to said 2-axis output data or on a three-dimensional coordinate system whose coordinate values correspond to said 3-axis output data and estimating the coordinates of reference point using a statistical technique so that a variation in the distance from the 2-axis or 3-axis output data group acquired by said output data acquisition means to the reference point becomes a minimum; and offset information calculation means for calculating offset information with respect to the output data of said earth magnetism detection means based on said coordinates of reference point.

2. The azimuth measuring device according to claim 1, wherein said reference point estimation means comprises:
coefficients and constant term calculation means for calculating coefficients and constant terms of simultaneous linear equations whose unknowns are said coordinates of reference point from said 2-axis or 3-axis output data group; and
simultaneous linear equation analysis means for estimating said coordinates of reference point by calculating solutions to said simultaneous linear equations including said coefficients and constant terms.

3. The azimuth measuring device according to claim 1, wherein said earth magnetism detection means is 3-axis earth magnetism detection means, and
when a degree of the variation of the output data group is a predetermined value or below with respect to the output data group of the axis whose degree of variation is a minimum out of the 3-axis output data group, said reference point estimation means defines a reference point on a two-dimensional coordinate system whose coordinate values correspond to the 2-axis output data for the 2-axis output data group which is generated by excluding the output data group of the axis whose degree of variation is a minimum from said 3-axis output data group and estimates said coordinates of reference point from said 2-axis output data group.

4. The azimuth measuring device according to claim 1, wherein said reference point estimation means comprises:
first difference calculation means for calculating a difference between a maximum value and minimum value of output data in the output data group of each axis from said 2-axis or 3-axis output data group; and
first difference decision means for deciding whether the difference calculated by said first difference calculation means is equal to or greater than a predetermined value or not, and
said reference point estimation means uses said 2-axis or 3-axis output data group for estimating said reference point only when the difference calculated by said first difference calculation means is equal to or greater than a predetermined value.

5. The azimuth measuring device according to claim 1, wherein said offset information calculation means comprises:
variation calculation means for calculating a variation at a predetermined number of the latest reference points calculated by said reference point estimation means, and
said offset information calculation means discards the reference point calculated by said reference point estimation means based on the calculation result of said variation calculation means.

6. The azimuth measuring device according to claim 5, wherein said variation calculation means calculates the difference between the two latest reference points calculated by said reference point estimation means.

7. The azimuth measuring device according to claim 1, further comprising:
second variation calculation means for calculating a variation at a predetermined number of the latest reference points calculated by said reference point estimation means; and
acceptability information creation means for creating acceptability information regarding the acceptability of said offset information based on the calculation result of said second variation calculation means.

8. The azimuth measuring device according to claim 7, wherein said acceptability information creation means divides the degree of acceptability of said offset information into a plurality of categories, classifies the offset information into any one of said categories according to the degree of variation calculated by said second variation calculation means and displays the degree of acceptability corresponding to the category.

9. The azimuth measuring device according to claim 1, wherein said offset information calculation means comprises:
distance calculation means for calculating the distance from said output data group to said reference point; and
distance decision means for deciding whether the distance calculated by said distance calculation means is outside a predetermined range or not, and
said offset information calculation means discards the output data group when the distance calculated by said distance calculation means is outside the predetermined range.

10. The azimuth measuring device according to claim 1, further comprising:
second distance calculation means for calculating the distance from said output data group to said reference point; and
reliability information creation means for creating reliability information regarding the reliability of the azimuth measurement result based on the distance calculated by said second distance calculation means.

11. The azimuth measuring device according to claim 10, wherein said reliability information creation means divides the degree of reliability of said azimuth measurement result into a plurality of categories, compares the distance calculated by said second distance calculation means with a plurality of thresholds, classifies the distance into any one of said categories and displays the degree of reliability corresponding to the category.

12. The azimuth measuring device according to claim 1, wherein said output data acquisition means comprises:
third difference calculation means for calculating a difference between the output data output from said earth magnetism detection means and a predetermined number of pieces of immediately preceding output data acquired by said output data acquisition means or the output data output immediately before from said earth magnetism detection means; and
third difference decision means for deciding whether the difference calculated by said third difference calculation means is smaller than a predetermined value or not, and
said output data acquisition means does not acquire but discards the output data output from said earth magnetism detection means when the difference calculated by said third difference calculation means is smaller than the predetermined value.

13. An azimuth measuring method comprising:
a step of changing detection directions of two axes for measurement of earth magnetism while keeping the detection directions of two axes on a predetermined plane or changing the detection directions of three axes in a three-dimensional space;

a step of acquiring the 2-axis or 3-axis output data for measurement of earth magnetism when said detection directions change;

a step of deciding whether said output data is acquired a predetermined number of times or more or not;

a step of defining a reference point on a two-dimensional coordinate system whose coordinate values correspond to said 2-axis output data or on a three-dimensional coordinate system whose coordinate values correspond to said 3-axis output data and estimating the coordinates of reference point using a statistical technique so that a variation in the distance from the output data group consisting of the 2-axis or 3-axis output data acquired said predetermined number of times or more to the reference point becomes a minimum;

a step of calculating offset values with respect to said 2-axis or 3-axis output data based on said estimated coordinates of reference point;

a step of storing said calculated offset values;

a step of correcting said output data according to said stored offset values and obtaining azimuth information by performing an azimuth calculation using said output data; and a step of displaying azimuth result.

14. The azimuth measuring method according to claim 13, wherein said step of estimating the coordinates of reference point comprises:

a step of calculating coefficients and constant terms of simultaneous linear equations whose unknowns are said coordinates of reference point from said 2-axis or 3-axis output data group; and a step of calculating solutions to said simultaneous linear equations including said coefficients and constant terms and estimating said coordinates of reference point.

15. The azimuth measuring method according to claim 13, wherein said step of changing said detection direction is intended to change detection directions of three axes in a three-dimensional space, and said step of estimating the coordinates of reference point comprises:

a step of calculating the degree of variation of output data of the output data group of each axis of said 3-axis output data group and obtaining the axis corresponding to the minimum degree of variation and a minimum value of said degree of variation, a step of deciding whether said minimum value of the degree of variation is equal to or lower than a predetermined value or not; and a step of defining, when said minimum value of the degree of variation is equal to or lower than the predetermined value, a reference point on a two-dimensional coordinate system whose coordinate values correspond to the 2-axis output data for the 2-axis output data group wherein the output data group of the axis whose degree of variation becomes a minimum is excluded from said 3-axis output data group and estimating said coordinates of reference point from said 2-axis output data group.

16. The azimuth measuring method according to claim 13, wherein said step of estimating the coordinates of reference point comprises:

a step of calculating the difference between a maximum value and minimum value of output data of the output data group of each axis of said output data group;

a step of deciding whether the difference between said maximum value and minimum value is equal to or greater than a predetermined value or not; and a step of estimating said coordinates of reference point when said difference between the maximum value and minimum value is equal to or greater than the predetermined value.

17. The azimuth measuring method according to claim 13, wherein the step of calculating offset values with respect to said 2-axis or 3-axis output data comprises:

a step of calculating a variation at a predetermined number of the latest reference points calculated in the step of estimating the coordinates of reference point; and a step of discarding the reference point calculated in the step of estimating the coordinates of reference point based on the calculation result of said variation.

18. The azimuth measuring method according to claim 13, further comprising:

a step of calculating a variation at a predetermined number of said estimated latest coordinates of reference points; and a step of creating acceptability information regarding the acceptability of the offset values calculated in said step of calculating said offset values based on the calculation result of said variation.

19. The azimuth measuring method according to claim 13, wherein the step of calculating offset values with respect to said 2-axis or 3-axis output data comprises:

a step of calculating the distance from said output data group to said reference point;

a step of deciding whether the distance from said output data group to said reference point is outside a predetermined range or not; and a step of discarding the output data group when the distance from said output data group to said reference point is outside the predetermined range.

20. The azimuth measuring method according to claim 13, further comprising a step of calculating the distance from said output data group to said reference point; and a step of creating reliability information regarding the reliability of the azimuth measurement result based on said distance calculation result.

* * * * *